United States Patent
Asirvatham

(10) Patent No.: US 12,221,579 B2
(45) Date of Patent: *Feb. 11, 2025

(54) FORMULATION FOR THE RECOVERY OF HYDROCARBONS INCLUDING A SURFACTANT SYSTEM

(71) Applicant: AdvanSix Resins & Chemicals LLC, Parsippany, NJ (US)

(72) Inventor: Edward Asirvatham, Chatham, NJ (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,068

(22) Filed: Nov. 29, 2023

(65) Prior Publication Data

US 2024/0150640 A1 May 9, 2024

Related U.S. Application Data

(62) Division of application No. 17/196,893, filed on Mar. 9, 2021, now Pat. No. 11,912,930.

(60) Provisional application No. 62/988,194, filed on Mar. 11, 2020.

(51) Int. Cl.
| | |
|---|---|
| *E21B 43/16* | (2006.01) |
| *C09K 8/04* | (2006.01) |
| *C09K 8/584* | (2006.01) |
| *C09K 8/60* | (2006.01) |
| *C09K 8/32* | (2006.01) |

(52) U.S. Cl.
CPC .............. *C09K 8/584* (2013.01); *C09K 8/602* (2013.01); *C09K 8/04* (2013.01); *C09K 8/32* (2013.01); *E21B 43/16* (2013.01)

(58) Field of Classification Search
CPC .......... C09K 8/584; C09K 8/602; C09K 8/32; E21B 43/16
See application file for complete search history.

(56) References Cited

U.S. PATENT DOCUMENTS

| | | |
|---|---|---|
| 3,213,500 A | 10/1965 | Thompson |
| 3,704,486 A | 12/1972 | Blacklock |
| 4,137,180 A | 1/1979 | Naik et al. |
| 4,276,460 A | 6/1981 | Haesly et al. |
| 4,297,769 A | 11/1981 | Coules |
| 4,432,881 A | 2/1984 | Evani |
| 4,502,193 A | 3/1985 | Harmon et al. |
| 4,548,744 A | 10/1985 | Connor |
| 4,664,458 A | 5/1987 | Worth |
| 4,940,573 A | 7/1990 | Sebag et al. |
| 5,060,100 A | 10/1991 | Mihara et al. |
| 5,223,179 A | 6/1993 | Connor et al. |
| 5,496,486 A | 3/1996 | Staley |
| 5,500,208 A | 3/1996 | Charbonneau |
| 5,520,835 A | 5/1996 | Sivik et al. |
| 5,580,203 A | 12/1996 | Read et al. |
| 5,599,781 A | 2/1997 | Haeggberg et al. |
| 5,706,559 A | 1/1998 | Oliver et al. |
| 5,798,095 A | 8/1998 | Racky |
| 5,958,894 A | 9/1999 | Heath et al. |
| 5,972,323 A | 10/1999 | Lang et al. |
| 6,072,063 A | 6/2000 | Eyrisch et al. |
| 6,114,757 A | 9/2000 | Delprete |
| 6,187,938 B1 | 2/2001 | Hrabalek et al. |
| 6,304,986 B1 | 10/2001 | Ma et al. |
| 6,329,446 B1 | 12/2001 | Sacripante et al. |
| 6,501,030 B1 | 12/2002 | Parizi et al. |
| 6,589,913 B1 | 7/2003 | Killick et al. |
| 6,702,592 B1 | 3/2004 | Harden et al. |
| 7,385,077 B1 | 6/2008 | Acosta et al. |
| 7,646,556 B1 | 1/2010 | Kose et al. |
| 7,653,847 B1 | 1/2010 | Liikanen et al. |
| 7,768,736 B2 | 8/2010 | Belmont et al. |
| 8,599,507 B2 | 12/2013 | Sanvido et al. |
| 8,964,320 B1 | 2/2015 | Hu et al. |
| 9,142,246 B1 | 9/2015 | Trantham et al. |
| 9,484,059 B2 | 11/2016 | Lim et al. |
| 9,552,846 B1 | 1/2017 | Lim |
| 9,580,535 B2 | 2/2017 | Wilson et al. |
| 10,876,072 B2 * | 12/2020 | Tang ........................ C11D 1/66 |
| 2003/0081357 A1 | 5/2003 | Hong et al. |
| 2003/0153780 A1 | 8/2003 | Haniff et al. |
| 2004/0198631 A1 | 10/2004 | Hellberg |
| 2005/0164903 A1 | 7/2005 | Ko et al. |
| 2006/0016785 A1 | 1/2006 | Egbe et al. |
| 2006/0128831 A1 | 6/2006 | Cook et al. |

(Continued)

FOREIGN PATENT DOCUMENTS

| | | |
|---|---|---|
| AU | 2003245683 A1 | 9/2003 |
| CA | 2006439 A1 | 7/1990 |

(Continued)

OTHER PUBLICATIONS

Berge, S.M. et al. "Pharmaceutical Salts" J. Pharm. Sci. 1977, 66 (1), 1-19 (Year: 1977).
Focus Technology Company, Daily Chemical Grade Antifreeze Thickener Hydroxypropyl Methylcellulose HPMC, Accessed 2023, pp. 1-5. (Year: 2023).
Hrabálek et al., "Esters of omega-amino acids as flexible penetration enhancers", Pharmazie, vol. 49, No. 5, May 1994, pp. 325-328.
Hrabálek et al., "Synthesis and Enhancing Effect of Transkarbam 12 on the Transdermal Delivery of Theophylline, Clotrimazole, Flobufen, and Griseofulvin", Pharmaceutical Research, vol. 23, No. 5, May 2, 2006, pp. 912-919.

(Continued)

*Primary Examiner* — Silvana C Runyan
(74) *Attorney, Agent, or Firm* — Faegre Drinker Biddle & Reath LLP

(57) ABSTRACT

Surfactants for use in formulations and processes suitable for hydrocarbon recovery. These formulations, include formulations suitable for fracking, enhancing oil and or gas recovery, and the recovery and/or production of bio-based oils.

21 Claims, 10 Drawing Sheets

(56) References Cited

U.S. PATENT DOCUMENTS

| | | | |
|---|---|---|---|
| 2006/0205609 A1 | 9/2006 | Cassidy et al. | |
| 2007/0142583 A1 | 6/2007 | Schorzman et al. | |
| 2007/0259802 A1 | 11/2007 | Heintz et al. | |
| 2008/0259100 A1 | 10/2008 | Rengaswamy et al. | |
| 2010/0119468 A1 | 5/2010 | Garcia et al. | |
| 2011/0166370 A1 | 7/2011 | Saunders et al. | |
| 2012/0019588 A1 | 1/2012 | Mubarekyan | |
| 2012/0263659 A1 | 10/2012 | Subkowski et al. | |
| 2013/0029895 A1* | 1/2013 | Bettiol | C11D 3/1266 510/237 |
| 2013/0336903 A1 | 12/2013 | Fernandez et al. | |
| 2015/0086491 A1 | 3/2015 | Subkowski et al. | |
| 2015/0216977 A1 | 8/2015 | Soula et al. | |
| 2015/0274628 A1 | 10/2015 | Madathil et al. | |
| 2015/0329728 A1 | 11/2015 | Miles et al. | |
| 2016/0022557 A1 | 1/2016 | Galleguillos et al. | |
| 2016/0106647 A1 | 4/2016 | Fevola et al. | |
| 2016/0108347 A1 | 4/2016 | McCarthy et al. | |
| 2016/0271034 A1 | 9/2016 | Fevola et al. | |
| 2017/0022159 A1 | 1/2017 | Boaz et al. | |
| 2017/0036991 A1 | 2/2017 | Magnani et al. | |
| 2017/0079898 A1 | 3/2017 | Fevola et al. | |
| 2017/0081277 A1 | 3/2017 | Boaz et al. | |
| 2017/0087068 A1 | 3/2017 | Callens et al. | |
| 2017/0152433 A1 | 6/2017 | Singh et al. | |
| 2017/0240804 A1 | 8/2017 | Tellez et al. | |
| 2017/0260449 A1 | 9/2017 | Barnes et al. | |
| 2018/0057773 A1 | 3/2018 | McMillen et al. | |
| 2018/0116941 A1 | 5/2018 | Wang | |
| 2018/0117157 A1 | 5/2018 | Soula et al. | |
| 2018/0155561 A1 | 6/2018 | Li et al. | |
| 2018/0178178 A1 | 6/2018 | Baseeth | |
| 2019/0010426 A1 | 1/2019 | Scialla et al. | |
| 2019/0390100 A1 | 12/2019 | Parini et al. | |
| 2020/0370404 A1 | 11/2020 | Gizzatov et al. | |
| 2021/0229053 A1 | 7/2021 | Asirvatham et al. | |
| 2021/0230100 A1 | 7/2021 | Asirvatham et al. | |
| 2021/0230106 A1 | 7/2021 | Asirvatham et al. | |
| 2021/0230107 A1 | 7/2021 | Asirvatham et al. | |
| 2021/0230108 A1 | 7/2021 | Asirvatham et al. | |
| 2021/0283030 A1 | 9/2021 | Asirvatham | |
| 2021/0284896 A1 | 9/2021 | Asirvatham | |
| 2021/0284936 A1 | 9/2021 | Asirvatham | |
| 2021/0289776 A1 | 9/2021 | Asirvatham | |
| 2021/0290765 A1 | 9/2021 | Asirvatham | |
| 2021/0292583 A1 | 9/2021 | Asirvatham | |
| 2021/0292647 A1 | 9/2021 | Asirvatham | |

FOREIGN PATENT DOCUMENTS

| | | |
|---|---|---|
| CA | 2647330 C | 1/2012 |
| CA | 3034712 A1 | 3/2018 |
| CN | 1078994 A | 12/1993 |
| CN | 1216525 A | 5/1999 |
| CN | 1340096 A | 3/2002 |
| CN | 101646645 A | 2/2010 |
| CN | 102741368 A | 10/2012 |
| CN | 102844386 A | 12/2012 |
| CN | 103221030 A | 7/2013 |
| CN | 104145324 A | 11/2014 |
| CN | 105802600 A | 7/2016 |
| CN | 106750342 A | 5/2017 |
| CN | 107920982 A | 4/2018 |
| CN | 108024926 A | 5/2018 |
| CN | 108024935 A | 5/2018 |
| CN | 108530307 A | 9/2018 |
| CN | 108905882 A | 11/2018 |
| CN | 110423201 A | 11/2019 |
| DE | 3939746 A1 | 6/1991 |
| DE | 29622184 U1 | 2/1997 |
| DE | 10021538 A1 | 12/2001 |
| EP | 0135217 A1 | 3/1985 |
| EP | 0385562 A2 | 9/1990 |
| EP | 0638236 A1 | 2/1995 |
| EP | 0826661 A2 | 3/1998 |
| EP | 1000544 A1 | 5/2000 |
| EP | 0883600 B1 | 10/2001 |
| FR | 0007727 M | 3/1970 |
| GB | 2204740 A | 11/1988 |
| GB | 2310659 A | 9/1997 |
| GB | 2311033 A | 9/1997 |
| JP | 49-076818 A | 7/1974 |
| JP | 49-082624 A | 8/1974 |
| JP | 53-005108 A | 1/1978 |
| JP | 57-046942 A | 3/1982 |
| JP | 61-278341 A | 12/1986 |
| JP | 01-190798 A | 7/1989 |
| JP | 04-156933 A | 5/1992 |
| JP | 04-349284 A | 12/1992 |
| JP | 06-293614 A | 10/1994 |
| JP | 07-223912 A | 8/1995 |
| JP | 08-007556 A | 1/1996 |
| JP | 09-266021 A | 10/1997 |
| JP | 11-233910 A | 8/1999 |
| JP | 11-323383 A | 11/1999 |
| JP | 2000-502718 A | 3/2000 |
| JP | 2001-500473 A | 1/2001 |
| JP | 2001-502334 A | 2/2001 |
| JP | 2003-267842 A | 9/2003 |
| JP | 2006-294170 A | 10/2006 |
| JP | 2007-003287 A | 1/2007 |
| JP | 2007-169508 A | 7/2007 |
| JP | 4156467 B2 | 9/2008 |
| JP | 2009-091709 A | 4/2009 |
| JP | 2009-108057 A | 5/2009 |
| JP | 2010-099653 A | 5/2010 |
| JP | 2010-144031 A | 7/2010 |
| JP | 4982624 B1 | 7/2012 |
| JP | 2013-511270 A | 4/2013 |
| JP | 2016-501832 A | 1/2016 |
| JP | 2017-195029 A | 10/2017 |
| JP | 2018-516588 A | 6/2018 |
| JP | 2023-512251 A | 3/2023 |
| JP | 2023-512253 A | 3/2023 |
| JP | 2023-512254 A | 3/2023 |
| JP | 2023-512256 A | 3/2023 |
| TW | 200904971 A | 2/2009 |
| WO | 97/31889 A1 | 9/1997 |
| WO | 98/16608 A2 | 4/1998 |
| WO | 98/45233 A2 | 10/1998 |
| WO | 00/32559 A1 | 6/2000 |
| WO | 00/42155 A1 | 7/2000 |
| WO | 01/74279 A1 | 10/2001 |
| WO | 03/68377 A1 | 8/2003 |
| WO | 2012/061093 A1 | 5/2012 |
| WO | 2012/068176 A1 | 5/2012 |
| WO | 2014/045213 A1 | 3/2014 |
| WO | 2014/059158 A1 | 4/2014 |
| WO | 2017/012087 A1 | 1/2017 |
| WO | 2017/048528 A1 | 3/2017 |
| WO | 2017/048555 A1 | 3/2017 |
| WO | 2017/075531 A1 | 5/2017 |
| WO | 2017/199921 A1 | 11/2017 |
| WO | 2018/115191 A1 | 6/2018 |
| WO | 2018/144082 A1 | 8/2018 |
| WO | 2019/010368 A1 | 1/2019 |
| WO | WO-2019110371 A1 * | 6/2019 ........... C07C 227/22 |

OTHER PUBLICATIONS

Hrabalek. Journal of Pharmaceutical Sciences, vol. 94, No. 7, 2005 (Year: 2005).

International Preliminary Report on Patentability received for PCT Patent Application No. PCT/US2021/014440, mailed on Aug. 11, 2022, 7 pages.

International Preliminary Report on Patentability received for PCT Patent Application No. PCT/US2021/014444, mailed on Aug. 11, 2022, 7 pages.

International Preliminary Report on Patentability received for PCT Patent Application No. PCT/US2021/014447, mailed on Aug. 11, 2022, 7 pages.

(56) References Cited

OTHER PUBLICATIONS

International Preliminary Report on Patentability received for PCT Patent Application No. PCT/US2021/014457, mailed on Aug. 11, 2022, 6 pages.
International Preliminary Report on Patentability received for PCT Patent Application No. PCT/US21/21565, mailed on Sep. 22, 2022, 9 pages.
International Preliminary Report on Patentability received for PCT Patent Application No. PCT/US21/21569, mailed on Sep. 22, 2022, 7 pages.
International Preliminary Report on Patentability received for PCT Patent Application No. PCT/US21/21571, mailed on Sep. 22, 2022, 8 pages.
International Preliminary Report on Patentability received for PCT Patent Application No. PCT/US21/21574, mailed on Sep. 22, 2022, 9 pages.
International Preliminary Report on Patentability received for PCT Patent Application No. PCT/US21/21595, mailed on Sep. 22, 2022, 11 pages.
International Preliminary Report on Patentability received for PCT Patent Application No. PCT/US21/21596, mailed on Sep. 22, 2022, 8 pages.
International Preliminary Report on Patentability received for PCT Patent Application No. PCT/US21/21597, mailed on Sep. 22, 2022, 8 pages.
International Search Report and Written Opinion received for PCT Patent Application No. PCT/US2021/014440, mailed on Apr. 30, 2021, 9 pages.
International Search Report and Written Opinion received for PCT Patent Application No. PCT/US2021/014444, mailed on Apr. 26, 2021, 12 pages.
International Search Report and Written Opinion received for PCT Patent Application No. PCT/US2021/014445, mailed on Apr. 26, 2021, 9 pages.
International Search Report and Written Opinion received for PCT Patent Application No. PCT/US2021/014447, mailed on Apr. 30, 2021, 9 pages.
International Search Report and Written Opinion received for PCT Patent Application No. PCT/US2021/014457, mailed on Apr. 30, 2021, 8 pages.
International Search Report and Written Opinion received for PCT Patent Application No. PCT/US2021/021565, mailed on Jun. 18, 2021, 13 pages.
International Search Report and Written Opinion received for PCT Patent Application No. PCT/US2021/021569, mailed on May 17, 2021, 9 pages.
International Search Report and Written Opinion received for PCT Patent Application No. PCT/US21/21571, mailed on Jul. 9, 2021, 9 pages.
International Search Report and Written Opinion received for PCT Patent Application No. PCT/US21/21574, mailed on Jul. 1, 2021, 10 pages.
International Search Report and Written Opinion received for PCT Patent Application No. PCT/US21/21595, mailed on Jul. 30, 2021, 15 pages.
International Search Report and Written Opinion received for PCT Patent Application No. PCT/US21/21596, mailed on Jun. 22, 2021, 10 pages.
International Search Report and Written Opinion received for PCT Patent Application No. PCT/US21/21597, mailed on Aug. 9, 2021, 11 pages.
Invitation to Pay Additional Fees received for PCT Patent Application No. PCT/US21/21595, mailed on Jun. 9, 2021, 9 pages.
Invitation to Pay Additional Fees received for PCT Patent Application No. PCT/US21/21597, mailed on Jun. 17, 2021, 7 pages.
Kerry P. Mahon et al: "Combinatorial Approach to Determine Functional Group Effects on Lipidoid-Mediated si RNA Delivery", Bioconjugate Chemistry, vol. 21, No. 8, Aug. 18, 2010 (Aug. 18, 2010), pp. 1448-1454.
Lawrence, Chemical Society Reviews, 1994. Surfactant Systems Their Use in Drug Delivery (Year: 1994).
Machine Translation of FR7.277M (Year: 1968).
Noventy et al., "Dimethylamino Acid Esters as Biodegradable and Reversible Transdermal Permeation Enhancers: Effects of Linking Chain Length, Chirality and Polyfluorination", Pharmaceutical Research, vol. 26, No. 1, Nov. 14, 2014, pp. 811-821.
Novotný et al., "Transkarbams as transdermal permeation enhancers: Effects of ester position and ammonium carbamate formation", Bioorganic & Medicinal Chemistry Letters, vol. 20, No. 09, May 1, 2010, pp. 2726-2728.
Research Disclosure, "Detergent compositions and fabric conditioning compositions containing dye transfer inhibiting polymers." No. 411, Jul. 1998, pp. 935-953.
Search Report and Written Opinion received for Singapore Patent Application No. SG 11202252703F, mailed on Apr. 5, 2024, 7 pages.
Search Report and Written Opinion received for Singapore Patent Application No. SG 11202251344V, mailed on Apr. 18, 2024, 7 pages.
Search Report and Written Opinion received for Singapore Patent Application No. SG 11202251370M, mailed on Apr. 18, 2024, 7 pages.
Search Report and Written Opinion received for Singapore Patent Application No. SG 11202251383Q, mailed on Apr. 18, 2024, 7 pages.
Search Report and Written Opinion received for Singapore Patent Application No. SG 11202252678W, mailed on Apr. 3, 2024, 7 pages.
Search Report and Written Opinion received for Singapore Patent Application No. SG 11202252714K, mailed on Apr. 3, 2024, 7 pages.
Search Report and Written Opinion received for Singapore Patent Application No. SG 11202252717R, mailed on Mar. 28, 2024, 7 pages.
Subkowski ,PE2E translation of JP 2013511270 A , Use Of Physiologically Cool Active Ingredients And Medicaments Containing Such Active Ingredients (Year: 2013).
Xue et al., "Exceptionally Strong Electronic Coupling in Crystalline Perylene Diimides via Tuning", Chemistry of Materials, vol. 23, No. 11, May 10, 2011, pp. 2689-2692.

* cited by examiner

FORMULATION FOR THE RECOVERY OF HYDROCARBONS INCLUDING A SURFACTANT SYSTEM

CROSS-REFERENCE TO RELATED APPLICATION

This application is a divisional of U.S. Pat. No. 11,912,930, filed Mar. 9, 2021, which claims priority to U.S. Provisional Application No. 62/988,194, filed Mar. 11, 2020, both of which are herein incorporated by reference in their entireties.

FIELD

The present disclosure pertains to surfactants for use in the production and recovery hydrocarbon, including oil and gas from wells and oils from bio-based processes. Such surfactants may include derivatives of amino acids wherein the derivatives have surface-active properties.

BACKGROUND

Surfactants (molecules with surface-active properties) are widely used in commercial production of oil and natural gas. These formulations may include a variety of liquids, emulsions, and foams used to recovery hydrocarbons from the earth and from bio-based sources. Both oil and natural gas may be found in contact with water or with water soluble substrates accordingly, surfactants may be included in formulations to improve the recovery of oils and/or gasses. Ideally, formulations for such production and recovery processes are easy to manufacture, deploy, and if practical, reuse.

The surfactants may be uncharged, zwitterionic, cationic, or anionic. Although in principle any surfactant class (e.g., cationic, anionic, nonionic, amphoteric) is suitable, it is possible that a formulation may include a combination of two or more surfactants from two or more surfactant classes.

Often, surfactants are amphiphilic molecules with a relatively water-insoluble hydrophobic "tail" group and a relatively water-soluble hydrophilic "head" group. These compounds may adsorb at an interface, such as an interface between two liquids, a liquid and a gas, or a liquid and a solid. In systems comprising relatively polar and relatively non-polar components the hydrophobic tail preferentially interacts with the relatively non-polar component(s) while the hydrophilic head preferentially interacts with the relatively polar component(s). In the case of an interface between water and oil, the hydrophilic head group preferentially extends into the water, while the hydrophobic tail preferentially extends into the oil. When added to a water-gas only interface, the hydrophilic head group preferentially extends into the water, while the hydrophobic tail preferentially extends into the air. The presence of the surfactant disrupts at least some of the intermolecular interaction between the water molecules, replacing at least some of the interactions between water molecules with generally weaker interactions between at least some of the water molecules and the surfactant. This results in lowered surface tension and can also serve to stabilize the interface.

At sufficiently high concentrations, surfactants may form aggregates which serve to limit the exposure of the hydrophobic tail to the polar solvent. One such aggregate is a micelle. In a typical micelle the molecules are arranged in a sphere with the hydrophobic tails of the surfactant(s) preferentially located inside the sphere and the hydrophilic heads of the surfactant(s) preferentially located on the outside of the micelle where the heads preferentially interact with the more polar solvent. The effect that a given compound has on surface tension and the concentration at which it forms micelles may serve as defining characteristics for a surfactant.

Crude oil development and production from oil bearing formations can include up to three phases: primary, secondary and tertiary (or enhanced) recovery. During primary recovery, the natural energy present in the formation (e.g., water, gas) and/or gravity drives oil into the production wellbore. As oil is produced from an oil bearing formation, pressures and/or temperatures within the formation may decline. Artificial lift techniques (such as pumps) may be used to bring the oil to the surface. Only about 10 percent of a reservoir's Original Oil In Place (OOIP) is typically produced during primary recovery. Secondary recovery techniques are employed to extend the field's productive life and generally include injecting a displacing fluid such as water (waterflooding) to displace oil and drive it to a production wellbore.

Secondary recovery techniques typically result in the recovery of an additional 20 to 40 percent of a reservoir's OOIP. However, even if waterflooding were continued indefinitely, typically more than half of the OOIP would remain unrecovered. Poor mixing efficiency between water and oil (because of high interfacial tension between the water and oil), capillary forces in the formation, the temperature of the formation, the salinity of the water in the formation, the composition of the oil in the formation, poor sweep of the injected water through the formation, and other factors contribute to the inefficiency. Primary and secondary techniques therefore leave a significant amount of oil in the reservoir.

With much of the easy-to-produce oil already recovered from oil fields, producers have employed tertiary, or enhanced oil recovery (EOR), techniques that offer potential for recovering 30 to 60 percent or more of a reservoir's OOIP. Three major categories of EOR have succeeded commercially: thermal recovery, gas injection, and chemical techniques. Thermal recovery introduces heat (e.g., injection of steam) to lower the viscosity of the crude oil to improve its ability to flow through the reservoir. Gas injection uses nitrogen, carbon dioxide, or other gases that expand in a reservoir to push additional oil to a production wellbore. Other gases dissolve in the oil to lower its viscosity and improve its flowability. Chemical techniques inject surfactants (surfactant flooding) to reduce the interfacial tension that prevents or inhibits oil droplets from moving through a reservoir or inject polymers that allow the oil present in the formation to more easily mobilize through the formation.

Chemical techniques can be used before, during, or after implementing primary and/or secondary recovery techniques. Chemical techniques can also complement other EOR techniques. Surfactant flooding may include surfactant polymer (SP) flooding and Alkali Surfactant Polymer (ASP) flooding. In SP flooding, a reservoir is injected with water and/or brine containing ~1 wt. % surfactant and ~0.1 wt. % polymer. ASP flooding includes alkali in addition to the components used in SP flooding. ASP systems typically contain ~0.5 to 1 wt. % alkali, ~0.1 to 1 wt. % surfactant, and ~0.1 to 1 wt. % polymer. Typically, an SP or ASP flood is followed up with an injection of a displacing fluid, e.g., a waterflood and/or polymer "push fluid. The choice between SP or ASP depends on the acid value of the oil to be recovered, the concentration of divalent cations in the reservoir's brine, the economics of the project, the ability to perform water softening or desalination, and other factors. Alkali sequesters divalent cations in the formation brine and thereby reduces the adsorption of the surfactant during displacement through the formation. Alkali also generates an anionic surfactant (sodium naphthenate soap) in situ in the formation by reacting with naphthenic acids that are naturally present in the crude oil. The use of relatively inexpensive alkali reduces the surfactant retention and hence reduces the amount of surfactant required, and therefore also reduces the overall cost. Alkali can also help alter formation wettability to a more water-wet state to improve the imbibition rate.

In "wettability alteration," another EOR technique, surfactants are introduced into a reservoir, sometimes combined with altering electrolyte concentration, to displace adsorbed oil by effecting spontaneous imbibition of water onto the reservoir rock. This technique does not necessarily require low interfacial tensions between the oil and aqueous phases or the formation of a microemulsion phase. It also does not require a good sweep efficiency of the displacing fluid, and as such could have utility in carbonate reservoirs which can be fractured and typically have poor conformance. Surfactants used in SP and ASP floods have also displayed utility in wettability alteration.

A surfactant system, after injection into an oil bearing formation, takes up crude oil and brine from the formation to form a multiphase microemulsion in situ. When complete, the microemulsion is immiscible with the reservoir crude and exhibits low interfacial tension (IFT) with the crude oil and brine. Commercial surfactant EOR processes achieve ultralow IFTs (i.e., less than 10 mN/m) to mobilize disconnected crude oil droplets in the formation and create an oil bank where both oil and water flow as continuous phases. IFT changes with salinity, surfactant composition, crude oil com position, formation temperature, and other variables. For anionic surfactants, an optimal salinity exists at which the microemulsion solubilizes equal Volumes of oil and water, and at which the microemulsion exhibits nearly equal IFTs with oil and brine. The ultra-low IFT generally exists only in a narrow salinity range that overlaps the optimal salinity for a given microemulsion.

As explained by P. Zhao et al. ("Development of High-Performance Surfactants for Difficult Oils." SPE/DOE Improved Oil Recovery Symposium, Tulsa, Okla., April 2008, SPE 113432), the "selection of surfactants for enhanced oil recovery applications requires laboratory testing with crude oil from the target reservoir and may involve considerable effort to find a suitable surfactant and other . . . components . . . such as polymer, electrolytes, co-surfactant and co-solvent."

In the dry-mill ethanol process, yellow dent corn is milled, liquefied and sent to a fermenter. Enzymes and yeast are added to convert starch into ethanol, which is subsequently distilled off. This leaves a slurry called whole stillage. Whole stillage, which includes, a concentrated oil fraction, is then separated via centrifugation into liquid and solid fractions called thin stillage and wet cake respectively. While part of the thin stillage is recycled to help liquefy the milled corn, the rest is concentrated via evaporation into thick stillage (or syrup), which is dried and mixed with the wet cake to form distillers' dried gains with solubles (DDGS). This is sold as cattle feed and is a good source of protein.

Due to the concentrating effect dry-milling has on the oil fraction, corn oil extracted from thick stillage has become a profitable co-product for the ethanol industry. Although removing corn oil lowers the energy density of DDGS, some studies suggest that high oil content in DDGS interferes with milk production in dairy cattle and leads to undesirable pork bellies in swine. Therefore, removing some of the oil not only leads to a valuable co-product, but also may improve DDGS quality.

Current methods of extracting corn oil from thick stillage include solvent extraction (often hexane) and decantation. Hexane extraction, though effective, is energy intensive and requires a large amount of capital investment. Decantation requires little capital investment and has the potential of being just as effective as hexane extraction.

Decantation, using centrifuges takes advantage of the density difference between the oil and the aqueous phase to create buoyant force on the oil suspended in solution. In order for the buoyant force to be strong enough to overcome the interfacial interactions and surface friction acting on the oil, individual oil droplets must be large enough so that sufficient force can be generated. The current separation devices used in industry can separate particles as small as twenty micrometers in diameter. The success of current corn oil decantation is highly dependent on upstream processing conditions. Processes using high temperate, high or low pH, smaller grinds and long periods of retention tend to exhibit increased oil yields. These harsh conditions may not be the preferred way to extract oils for human or animal consumptions as such condition may adversely affect the nutritional and organoleptic properties of the final product.

The present disclosure provides formulations useful for extracting oil and natural gas from wells and in some applications from mixtures of oil based fuels and aqueous medium used in bio based process to produce hydrocarbon fuels such as bio-diesel. These products may be formulated to include one or more surfactants from one or more surfactant classes disclosed herein. The surfactants may be used as emulsifiers, wetting agents, dispersants, and/or agents to improve the recovery of hydrocarbons and or the separation of hydrocarbons from environments that include water.

The present disclosure provides surfactants for use in the production of oil and gas in the form of derivatives of amino acids that have surface-active properties. The amino acids may be naturally occurring or synthetic amino acids, or they may be obtained via ring-opening reactions of molecules such as lactams, for instance caprolactam. The amino acids may be functionalized to form compounds with surface-active properties. Characteristically, these compounds may have low critical micelle concentrations (CMC) and/or the ability to reduce the surface tension of a liquid.

The present disclosure provides a fracking fluid formulation, comprising at least one surfactant of Formula I,

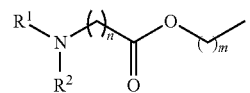

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; a polymer or a viscoelastic surfactant.

The present disclosure further provides a fluid for Improved Oil Recovery, comprising at least one surfactant of Formula I,

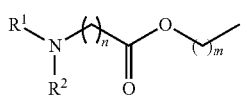

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl; an optional counterion associated with the compound which, if present, is selected from the group consisting of chloride, bromide, iodide, and hydroxide; a linear, cross-linked, and/or block copolymer; and/or an optional viscoelastic surfactant; and an optional co-surfactant.

The present disclosure also provides a formulation for recovering a biologically produced oil, comprising at least one surfactant of Formula I,

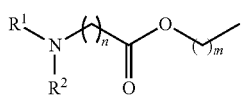

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; and water.

The present disclosure further provides a formulation for use in a mixture of fracking fluid and oil or natural gas comprising at least one surfactant of Formula I,

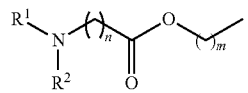

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; and water, and optionally a gas.

The above mentioned and other features of the disclosure, and the manner of attaining them, will become more apparent and will be better understood by reference to the following description of embodiments taken in conjunction with the accompanying drawings.

DETAILED DESCRIPTION

Figure 1:
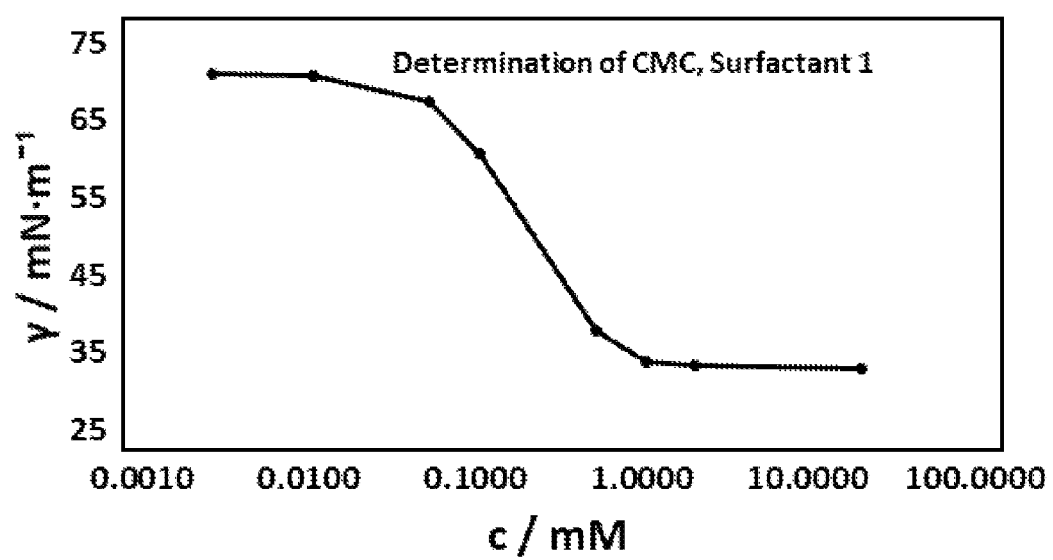
FIG. 1 shows a plot of surface tension versus concentration for Surfactant 1 measured at pH=7 as described in Example 1b, wherein the Y axis depicts the surface tension (γ) in millinewtons per meter (mN/m) and the X axis depicts the concentration (c) in millimoles (mM).

As used herein, the phrase "within any range using these endpoints" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the word "alkyl" means any saturated carbon chain, which may be a straight or branched chain.

As used herein, the phrase "surface-active" means that the associated compound is able to lower the surface tension of the medium in which it is at least partially dissolved, and/or the interfacial tension with other phases, and, accordingly, may be at least partially adsorbed at the liquid/vapor and/or other interfaces. The term "surfactant" may be applied to such a compound.

With respect to the terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

The present disclosure provides formulations for use in the production and/or recovery of hydrocarbons. Such formulations include: fracking fluids; improved Oil Recovery (IOR) injection fluids; formulation for increasing the production of natural gas; formulations for the recovery bio-oils from sources such a stillage; and vegetables, fruits, and nuts.

I. Fracking Fluids

To recover hydrocarbons from hydrocarbon-bearing subterranean geologic formations a wellbore is drilled into the formation to provide a flow path for the hydrocarbons from a reservoir within the formation to the surface. However, often a stimulation technique referred to as hydraulic fracturing is needed to improve the flow path and recovery of the hydrocarbon from oil or gas wells.

In hydraulic fracturing a specialized fluid is pumped into the targeted formation at a rate in excess of what can be dissipated through the natural permeability of the formation rock. The specialized fluids used in the technique are referred to fracturing fluids. The fluids result in a pressure build up until such pressure exceeds the strength of the formation rock. When this occurs, the formation rock fails and a so-called "fracture" is initiated. With continued pumping, the fracture grows in length, width and height. The fracture, which is generated by the application of this stimulation technique, creates a conductive path to the wellbore for the hydrocarbon.

Ideally, fracturing fluids should impart a minimal pressure drop in the pipe within the wellbore during placement and have an adequate viscosity to carry proppant material that prevents the fracture from closing. Moreover, the fracturing fluids should have a minimal leak-off rate to avoid fluid migration into the formation rocks so that, notably, the fracture can be created and propagated and should degrade so as not to leave residual material that may prevent accurate hydrocarbons to flow into the wellbore.

Some fracturing fluids comprise: (a) an aqueous medium, and (b) a thickening amount of a thickener composition comprising (i) a water-soluble or water-dispersible interpolymer having pendant hydrophobic groups chemically bonded thereto, (ii) a nonionic surfactant having a hydrophobic group(s) that is capable of associating with the hydrophobic groups on said organic polymer, and (iii) a water-soluble electrolyte. Additionally, the fluids preferably contain a stabilizing amount of a thiosulfate salt. As an example, an interpolymer of acrylamide and dodecyl acrylate was used in combination with a nonionic surfactant (HLB of from 10 to 14) to thicken a dilute aqueous solution of KCl and sodium thiosulfate; the aqueous Solution had excellent properties for use as a high temperature hydraulic fracturing fluid. See for example, Published PCT application WO 87/01758 entitled "Hydraulic Fracturing Process and Compositions."

Some fracturing fluids comprise: an aqueous liquid medium having increased low shear viscosity as provided by dispersing into the aqueous medium (1) a water-soluble polymer having pendant hydrophobic groups, e.g., an acrylamide dodecyl acrylate copolymer, and (2) a water-dispersible surfactant, e.g., sodium oleate, or dodecyl polyethyleneoxy glycol monoether. See, for example, U.S. Pat. No. 4,432,881 entitled "Water-Dispersible Hydrophobic Thickening Agent". At least some of the inventive surfactant recited herein may be included in these formulations.

Many fracking fluids comprise: water, a thickener, polymeric gels and surfactants. Alternative fracking fluids may include, viscoelastic surfactants in place of polymeric gels.

1. Polymeric Gels

Polymeric gels may be comprised of one or more of the following: linear polymers, crosslinked polymers, and/or co-block polymers.

Useful linear polymers include, but are not limited to; guar, derivatives of guar, hydroxyethyl cellulose, derivates hydroxyethyl cellulose, and mixtures thereof.

Useful crosslinked polymers include, but are not limited to, polymers crossed linked with ions of borate, zirconate, and/or titanate.

Useful co-block polymers include, but are not limited to, polyethylene oxide condensates of alkyl phenols, e.g., the condensation products of alkyl phenols having an alkyl group containing from about 6 to about 20 carbon atoms in either a straight chain or branched chain configuration, with ethylene oxide, the ethylene oxide being present in amounts equal to from about 1 to about 10 moles of ethylene oxide per mole of alkyl phenol. The alkyl substituents in such compounds may be derived from polymerized propylene, diisobutylene, octane, or nonane.

2. Surfactants

The pesticide formulations of the present disclosure comprise one or more surfactants, also referred to as the surfactant system. The surfactant system is included to emulsify the composition, and/or to act as an adjuvant. The surfactant system comprises at least one surfactant, which may be an amphoteric surfactant, a zwitterionic surfactant, a cationic surfactant, a nonionic surfactant, and optionally at least one other surfactant, which may be an amphoteric surfactant, a zwitterionic surfactant, a cationic surfactant, a nonionic surfactant, or a combination thereof. Such surfactants should be physically and chemically compatible with the essential components described herein, or should not otherwise unduly impair product stability, aesthetics, or performance.

Suitable surfactants for use in the fracking fluids of the present disclosure include one or more surfactants and/or co-surfactants of Formula I,

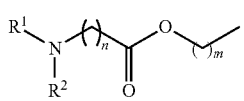

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

Suitable surfactants or co-surfactants may include one or more of any of Surfactants 1-5 described herein.

The concentration of the surfactant system in the fracking fluid formulations may range from about 20 wt. % or greater, about 30 wt. % or greater, about 40 wt. % or greater, or about 50 wt. % or lower, about 60 wt. % or lower, about 70 wt. % or lower, or about 80 wt. % or lower, or within any range using these endpoints, by weight of the composition.

3. Thickening Agents

The fracking fluid formulations may include a water-soluble polymer having pendant hydrophobic groups, e.g., an acrylamide dodecyl acrylate copolymer.

4. Viscoelastic Surfactant

Viscoelastic surfactants are generally defined as reagents that are substantially polymer free. Various vascoelastic surfactant fluids are disclosed, for example, in U.S. Pat. Nos. 4,615,825, 4,725,372, 4,735,731, CA-1298697, U.S. Pat. Nos. 5,551,516, 5,964,295, 5,979,555 and 6,232,274. One well-known polymer-free aqueous fracturing fluid comprising a viscoelastic Surfactant, which has been commercialized by the company group Schlumberger under the trademark ClearFRAC, and a mixture of a quaternary ammonium salt, the N-erucyl-N,N-bis(2-hydroxyethyl)-N-methylammonium chloride, with isopropanol and brine, the brine preferably including 3% by weight of ammonium chloride and 4% by weight of potassium chloride.

5. Other Additives

Optional additives include compounds that can reduce or mitigate the effect of solids such as sand that may become entrained in recovered oils. These compounds include clay stabilization or sand stabilization materials. Suitable clay stabilization or sand stabilization materials include epoxy resins, polyfunctional cat ionic polymers. Such as poly (N-acrylamidomethyltriethyl ammonium chloride) or poly (vinylbenzyltrimethyl ammonium chloride).

Still other optional ingredients that may be added to the fluids of the present invention include, but are not limited to corrosion inhibitors, oxygen scavengers, and bactericides.

6. Method of Making

The method includes the step of combining the surfactant, or surfactant system, the polymer and/or, and/or a viscoelastic surfactant, with water. This step may also include adding any additives described above. The aforementioned components and compounds may be added in any order to one or more of each other and in any amount and in one or more individual steps, e.g. in whole or in parts. In some methods of using fracking fluids a significant amount of water is combined with the fluid upon injection into a well.

7. Method of Use

The fracking fluid formulations of the present disclosure may be in liquid form at room temperature and atmospheric pressure, with the critical components solubilized therein.

If a concentrated fracking fluid is created it is intended to be mixed with an aqueous medium, mixing with the aqueous medium may occur before and/or during use of the fluid. The concentrated formulation may be added to a tank, before, simultaneously with or after, addition of the aqueous medium (water) to the tank. The concentrated fluid may be diluted significantly upon injection into a well, in which the well itself already includes water. In some instances the fluid can be injected into a well and followed by the introduction of water or in some instances additional water.

The water content in the diluted fracking formulation of the present disclosure may be from about 75 wt. % or greater, about 90 wt. % or greater, about 99 wt. % or greater, or about 99.9 wt. % or greater, based on the total weight of the diluted composition, and will ultimately depend on the amount of water needed to dilute fracking ingredient in the concentrated pesticidal formulation of the present disclosure to the desired concentration in the ready-to-use composition.

When mixed with and diluted in the aqueous medium, the components of the fluid are intended to be evenly distributed in the aqueous medium.

II. Formulations for Improved Oil Recovery (IOR)

Crude oil and/or naturally occurring gases are present within the pores of certain underground rocks. Typically, the initial or primary recovery of crude oil and/or naturally occurring gasses, uses the pressure within the oil reservoir to drive the crude oil up through the wellbore. During primary recovery only a small percentage of the crude oil in place is extracted, typically around 10% to 30% for most oil reservoirs.

Additional amounts of oil can be produced using water-flooding or gas injection, known as secondary recovery. Secondary recovery is relatively inexpensive and effective in producing up to an additional 5% to 20% of crude oil originally in the reservoir. Secondary recovery applies a pressure to the oil reservoir to drive the crude oil up through the wellbore. However, primary and secondary recovery processes can extract less than half of the original oil in the reservoir. Much of the oil that remains is discontinuous and is held in the rocks by very strong capillary forces. Due to costs, many wells are not used after the primary and secondary recovery processes have been completed.

Additional processes to increase the amount of the extracted oil are sometime referred to as enhanced oil recovery (EOR), or improved oil recovery (IOR) or tertiary recovery. EOR serves to improve oil displacement by reducing the interfacial tension (IFT) between the oil and water and by restoring the formation pressure to extract the crude oil. The three major types of EOR include chemical or caustic flooding, miscible displacement using carbon dioxide ($CO_2$) injection or hydrocarbon injection, and thermal recovery using steam flooding or in-situ combustion.

Another method for improving oil recovery from a well is miscible gas flooding. Miscible gas flooding can be performed with carbon dioxide, to reduce the viscosity of the crude oil present in the subterranean formation in order to increase the flow of hydrocarbons to a production well. Carbon dioxide, which acts as a solvent to reduce the viscosity of the crude oil, is an effective and relatively inexpensive miscible gas. During a miscible carbon dioxide flooding procedure the carbon dioxide is typically in the liquid and/or super critical phase. A method used to increase the effectiveness of miscible gas flooding is to add a foaming surfactant to the process.

Miscible displacement introduces miscible gases into the oil reservoir. Carbon dioxide is most commonly used because the gas reduces the oil viscosity and is less expensive than liquefied petroleum gas.

Thermal recovery introduces heat in the oil reservoir to cause the crude oil to reduce its viscosity so that the oil flows toward the wellbore. During thermal recovery crude oil undergoes physical and chemical changes because of the effects of the heat supplied. Physical properties such as viscosity, specific gravity and IFT are altered. The chemical changes involve different reactions such as cracking and dehydrogenation. However, it is costly to build a huge facility and piping system to generate and transport large amounts of $CO_2$, and many oil fields are located in areas not feasible to build such facilities. Also, $CO_2$ is mostly suitable for lighter oil fields. While thermal recovery is only suitable for certain fields, particularly those with shallow depth and heavy oils flood, the injection may be followed by a cheaper fluid, such as viscous water, and later water alone. The injection of the surfactants, viscous water and water involves the displacement of crude oil to the production well.

Still another tertiary recovery process involves chemical or caustic flooding. This type of EOR uses an aqueous flood that includes surfactants, polymers and/or caustic compounds. The aqueous flood decreases the IFT and pushes the crude oil from the rock. This crude oil, in the form of immobile, capillary-trapped droplets, can be mobilized by injection of an aqueous flood with surfactants. The surfactants interact with the crude oil to form a micro-emulsion that reduces the capillary trapping forces to a very low level. Once mobilized, the crude oil forms a growing bank that leaves almost no oil behind in the flooded part of the reservoir. After the aqueous flood, the injection may be followed by a cheaper fluid, such as viscous water, and later water alone. The injection of the surfactants, viscous water and water involves the displacement of crude oil to the production well. Several patents and publications have discussed methods for enhanced oil recovery using surfactants.

The invention involves the use of various amphoteric surfactants, including but not limited to, alkyl amidopropyl betaine sulfonates, alkyl dimethyl betainesulfonates, alkyl hydroxy sultaines sulfonates, alkyl sulfobetaine sulfonates and alkyl amine oxide sulfonates as low adsorbing surfactants for applications including but not limited to, IOR, drilling, viscoelastic surfactant, acidizing, fracturing, foaming and production. The present invention involves using a sulfonating agent to react with the double bond of certain amphoteric surfactants, including but not limited to, alkylene amidopropyl betaines, alkylene dimethyl betaines, alkylene hydroxy sultaines, alkylene Sulfobetaines, and, alkylene amine oxide to make the corresponding sulfonated amphoteric surfactants. The sulfonated amphoteric surfactants have been found to give ultra-low interfacial tension (IFT), viscoelastic properties, compatibility with brines containing high salt and divalent ions, and, low adsorption onto reservoir rock. Some embodiments of the invention involve the use of various amphoteric surfactants, including but not limited to, alkyl amidopropyl betaine sulfonates, alkyl dimethyl betaine sulfonates, alkyl hydroxy sultaines sulfonates, alkyl sulfobetaine sulfonates and alkyl amine oxide sulfonates as low adsorbing surfactants for applications including but not limited to, IOR, drilling, viscoelastic surfactant, acidizing, fracturing, foaming and production.

1. Aqueous Injection Fluid/Carrier

Aqueous carriers that can be used in various formulations include but are not limited to water, brine, river water, synthetic brine and sea water. Brine often includes one or more salts such as mono and/or divalent inorganic salts.

In many of the inventive formulations about 40 wt. % of the disclosed aqueous hydraulic fracturing compositions includes a carrier (e.g., the carrier is present in the compositions in an amount in the range of at least about 40 wt. % to about 99.88 wt. %, such as 40 wt. %, 50 wt. %, 60 wt. %, 70 wt. %, 80 wt. %, 90 wt. %, 95 wt. %, or more). The carrier can be any suitable material that can dissolve the active ingredients and co-ingredients and deliver the hydraulic fracturing composition to a hydraulic fracturing site. Water is a convenient carrier for liquid embodiments of the disclosed composition. The hydraulic fracturing composition may also be prepared as a gel, dip, foam, or spray.

2. Alkali

Alkalis are used as is known in the art to form "in situ" surfactants that act synergistically with the injected surfactant in some cases. Examples of alkalis that may be used to practice the invention include but are not limited to sodium hydroxide, Sodium carbonate, sodium borate, sodium silicate. Typically, alkali is used at concentration of from 0 to about 5 wt. % of the injection fluid, although more may be added as needed.

3. Viscosifiers

Examples of viscosifiers that may be used to practice the invention include but are not limited to polyacrylamides, AMPS co-polymers, xanthan gum, other natural; and synthetic gums and polymers generally known to the art and used to increase the viscosity of the injection fluid when necessary to control mobility and sweep efficiency. Generally, viscosifiers are used at concentrations of 0 to about 1 wt. % of the injection fluid, although may be used as needed.

4. Co-Solvents

Co-solvents may be used as are known to the art, to reduce the viscosity of the injection fluid, improve freeze-thaw or compatibility at high concentrations. Exemplary co-solvents include but are not limited to $C_1$-$C_8$ alcohols, $C_1$-$C_8$ alcohol alkoxylates, and glycerin. Co-solvents are used at concentrations of 0 to about 50 wt. % of the injection fluid.

5. Surfactant and Co-Surfactants

Examples of surfactants and co-surfactants that may be used include one or more compounds chosen from the group comprising anionic surfactants, cationic surfactants, amphoteric surfactants, nonionic surfactants. These have been used by those familiar with the art. Generally, co-surfactants are used at concentrations of 0 to about 5 wt. % of the total injection liquid formulation, although more may be added as needed.

The IOR fluid formulations of the present invention comprise one or more surfactants, also referred to as the surfactant system. The surfactant system may be used as a dispersing or wetting agent. The surfactant system may also be used as an emulsifier component to form a stable emulsion of the liquid fungicide formation when prepared for agricultural applications. The emulsifier component may also be used to form a stable emulsifiable concentrate. The surfactant system comprises at least one surfactant, which may be an amphoteric surfactant, a zwitterionic surfactant, a cationic surfactant, a nonionic surfactant, and optionally at least one other surfactant, which may be an amphoteric surfactant, a zwitterionic surfactant, a cationic surfactant, a nonionic surfactant, or a combination thereof.

Suitable surfactants for use in the fungicidal formulations of the present disclosure include one or more surfactants and/or co-surfactants of Formula I,

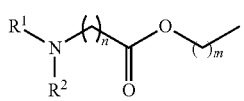

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

Suitable surfactants or co-surfactants may include one or more of any of Surfactants 1-5 described herein.

The total amount of the one or more surfactants in the fungicidal formulation may be about 1 wt. % or greater, about 5 wt. % or greater, about 10 wt. % or greater, or about 15 wt. % or less, about 20 wt. % or less, about 25 wt. % or less, about 30 wt. % or less, about 35 wt. % or less, or within any range using these endpoint 6. Co-Emulsifier or Co-Surfactant Some embodiments of the invention include the use of, foam-forming surfactant compositions including surfactant mixtures of at least one surfactant according to the disclosure as well at least one additional surfactant such as, sulfosuccinamate surfactant with at least one sulfosuccinate surfactant, selected from monoester sulfosuccinate surfactants and diester sulfosuccinate surfactants, and blends thereof, as well as these surfactant mixtures blended with further surfactants which are, inter alia, alkanolamides, alkyl sulfates, alpha-olefin sulfonates, betaines, fatty acid soaps, fatty alcohol alkoxylates, ethoxylated sorbitan esters, and sulfobetaines produce increased amounts of stable foams that exhibit, inter alia, extended foam half-life in seawater, seawater/diesel mixtures, and brine. These surfactant mixtures may optionally comprise a solvent, which is preferably water, or an aqueous solution that also comprises salts, foam boosters such as xanthan gum, oils which may be hydro carbon oils or vegetable oils, and thickeners or preservatives. Compared to foam-forming compositions of the prior art, these formulations offer improvements in the amount of foam generated, the foam stability and the lifetime of the foam.

Some commercially desirable foam-forming surfactant compositions as described herein offer improved foaming performance in diverse aqueous media including seawater (usually containing an average mass faction of dissolved salts about 3.5%, the largest part of which is sodium chloride) and brine (i.e. aqueous salt solutions containing typically mass fractions of up to 12%, such as from 0.1% to 11%, of dissolved salts of monovalent and divalent cations). The improved surfactant compositions are functional both at ambient temperature (typically 23° C.), and lower temperatures, such as from 1° C. up to 23° C. or elevated temperatures, such as more than 23° C. up to 95° C. This includes creating a formulation that offers greater overall foam volume, improved foam stability and maximum lifetime of the foam (i.e., foam half-life, the time required for 50% of the volume of the liquid media to separate out of the original foam). Moreover, the foam-forming surfactant compositions as fully described herein advantageously offer improved performance at lower concentrations thereby reducing environmental and worker exposure, while simultaneously exhibiting a lower tendency to form oil in water emulsions, which is also advantageous as it would simplify oil recovery in production.

III. Emulsions and/or Foams

Aqueous foam-forming surfactant compositions can be made therefrom by addition of water or aqueous salt solutions, such as seawater or brine, optionally in mixture with a hydrocarbon or a mixture of hydrocarbons, and effective foam-forming amounts of one or more foam forming surfactant composition described herein. It is also possible to use supercritical gases as liquid media, whereto effective foam-forming amounts of the foam-forming surfactant compositions described herein are added. The types of surfactants detailed in the invention include anionic surfactants, mixtures of two or more anionic surfactants, and combinations of any of these with cationic, amphoteric, zwitterionic, and nonionic surfactants, and the gases may include, for example, one or more of air, carbon dioxide, nitrogen, methane, or other natural and produced gases.

One method for improving oil recovery from a well is miscible gas flooding. Miscible gas flooding can be performed with carbon dioxide, to reduce the viscosity of the crude oil present in the subterranean formation in order to increase the flow of hydrocarbons to a production well. Carbon dioxide, which acts as a solvent to reduce the viscosity of the crude oil, is an effective and relatively inexpensive miscible gas. During a miscible carbon dioxide flooding procedure, the carbon dioxide is typically in the liquid and/or super critical phase. A method used to increase the effectiveness of miscible gas flooding is to add a foaming surfactant to the process.

In one aspect of the invention includes methods for recovering petroleum or natural gas from a reservoir or subterranean oil- or gas-bearing geological formation during the injection of a gas using foam forming surfactant compositions according to the invention. The methods contemplated by the present invention include contacting the oil or gas in the formation with any one or more of the foam-forming surfactant compositions and the injected gas so as to assist in the recovery of oil. The methods contemplated herein for recovery of petroleum or natural gas using the foam-forming surfactant compositions described herein can be performed as part of any one or more of the primary, secondary, or tertiary recovery techniques standard to the industry. Foam-forming surfactants composition of the invention can be used as solutions in a solvent or liquid vehicle, wherein the solvent is selected from water, aqueous salt solutions, liquefied gases, supercritical gases, and mixtures of these. Typically, the surfactant is incorporated into the aqueous media and a foam is created. If an aqueous salt solution is used as solvent, an aqueous foam forming surfactant composition is obtained, wherein the combination of the foam-forming surfactant composition and the water or aqueous salt solution preferably comprises a mass fraction of at least 0.2%, and preferably, up to 10%, of dissolved inorganic salts, and foam can be generated therefrom by intimate mixing with a gas in a foam generator. It is also possible to generate a foam in situ through introduction under pressure of alternating slugs of a gas and of the foam-forming surfactant composition into a subterranean oil- or gas-bearing geological formation which, in many cases, also contains water or aqueous salt solutions. The same mass fraction of at least 0.2%, and preferably, up to 10%, of dissolved inorganic salts is usually obtained thereby.

The roles performed by emulsion in the recovery of hydrocarbons such as oils and natural gas include foams which may be used, for example, to enhance recovery of a gas or an oil from a well source. In some embodiment that emulsion may be formed with the oil or gas to be recovered from for example, a well or from a product of a bio process. In some embodiments the invention surfaces disclosures herein are used to create the emulsion for example a foam. In still other embodiments surfactants may be used to break an emulsion which includes an oil or a gas to be recovered.

Foams may be formed by adding an effective amount of at least one anionic surfactant present within a high salinity foamed fluid composition in an effective amount to generate an IFT as low as 10-mN/m. The anionic surfactant may be an inventive surfactant or a sulfonate surfactant and/or a sulfate surfactant. The foamed fluid composition may be used to perform an operation, including but not limited to, a gas lift operation, a drilling operation, a completion operation, a stimulation operation, a fracturing operation, an injection operation, an enhanced oil recovery operation, and combinations thereof.

Foamed fluids are used in a variety of applications during the recovery of hydrocarbons from subterranean reservoirs. Foamed fluids include fluids that include a base fluid, a foaming agent, and a gas, including but not limited to nitrogen, carbon dioxide, air, methane, and the like. The base fluid may be foamed to reduce the amount of base fluid required, to reduce the amount of fluid loss to the formation, and/or to provide enhanced proppant suspension in fracturing fluids. 'Foaming agent' is defined herein to be an agent for facilitating the foaming of a base fluid when gas is mixed therewith.

Foamed fluids may also be used during stimulation operations (e.g. unloading of gas wells) to displace any pre-existing fluid and/or formation fluid present in the wellbore. 'Pre-existing fluid' is defined herein as a fluid present in the subterranean reservoir wellbore prior to the introduction of the foaming additive and/or the foamed fluid composition into the subterranean reservoir wellbore. 'Formation fluid' is defined herein to be any fluid produced from an oil bearing subterranean formation including but not limited to oil, natural gas, water, and the like. Formation fluids may be considered pre-existing fluids, but pre-existing fluids may not necessarily be a formation fluid. For example, other downhole fluids may be injected into the subterranean reservoir wellbore and are still present in the wellbore when the foaming additive is introduced into the wellbore. Thus, the downhole fluid (e.g. drilling fluid, completion fluid, fracturing fluid, injection fluid, etc.) may be the 'base fluid' upon introduction of the foaming additive and gas into the subterranean reservoir wellbore.

The base fluid of a foamed fluid may be a drilling fluid, a completion fluid, a stimulation fluid, a fracturing fluid, an injection fluid, and combinations thereof. Non-limiting examples of the use of such fluids may involve unloading oil or gas wells, enhanced oil recovery operation, heavy oil recovery, a drilling operation, a fracturing operation, pressure pumping, cementing, acidizing or other stimulation operation, and the like.

A non-limiting example of a foamed drilling fluid may be one where the drilling operation requires the drilling fluid to have a low density; for example, the density of the foamed drilling fluid may range from about 2.0 ppg (about 0.24 g/cm$^3$) independently to about 8.0 ppg (about 0.96 g/cm$^3$)

Drilling fluids are typically classified according to their base fluid. In water-based fluids, solid particles are suspended in a continuous phase consisting of water or brine. Oil can be emulsified in the water, which is the continuous phase. "Water-based fluid" is used herein to include fluids having an aqueous continuous phase where the aqueous continuous phase can be all water or brine, an oil-in-water emulsion, or an oil-in-brine emulsion. Brine-based fluids, of course are water-based fluids, in which the aqueous component is water based. Oil-based fluids are the opposite or inverse of water-based fluids.

"Oil-based fluid" is used herein to include fluids having a non-aqueous continuous phase where the non-aqueous continuous phase is all oil, a non-aqueous fluid, a water-in-oil emulsion, a water-in-non-aqueous emulsion, a brine-in-oil emulsion, or a brine-in-non-aqueous emulsion. In oil-based fluids, solid particles are suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins. Oil-based fluid as defined herein may also include synthetic-based fluids or muds (SBMs), which are synthetically produced rather than refined from naturally-occurring materials. Synthetic-based fluids often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these brine types.

One type of drilling operation involves cementing where cement is pumped into place in a wellbore. Cementing operations may be used to seal an annulus after a casing string has been run, to seal a lost circulation zone, to set a plug in an existing well from which to push off with directional tools, or to plug a well so that it may be abandoned. Before cementing operations commence, the volume of cement to be placed in the wellbore is determined, as well as the physical properties of the slurry and the set cement needed, including density and viscosity. The drilling fluids may be displaced to place the cement in the wellbore. In carrying out primary cementing, as well as remedial cementing operations in wellbores, the cement slurries utilized must often be light-weight to prevent excessive hydrostatic pressure from being exerted on subterranean formations penetrated by the wellbore. As a result, a variety of light-weight cement slurries have been developed and used, including foamed cement slurries.

In addition to being light-weight, a foamed cement slurry contains compressed gas, which improves the ability of the slurry to maintain pressure and to prevent the flow of formation fluids into and through the slurry during its transition time, i.e., the time during which the cement slurry changes from a true fluid to a hard set mass. Other surfactants, besides those used as foaming agents, may be used as foam stabilizers for preventing the foam slurries from prematurely separating into slurry and gas components, and may also be added to the slurry. foamed cement slurries may have low fluid loss properties.

There are a variety of functions and characteristics that are expected of completion fluids. The completion fluid may be placed in a well to facilitate final operations prior to initiation of production. Completion fluids are typically brines, including chlorides, bromides, formates, but may be any non-damaging fluid having proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof. Chemical compatibility of the completion fluid with the reservoir formation and fluids can be very important. Chemical additives, such as polymers and surfactants are known in the art for being introduced to the brines used in well servicing fluids for various reasons that include, but are not limited to, increasing viscosity, and increasing the density of the brine.

Servicing fluids, such as remediation fluids, stimulation fluids, workover fluids, and the like, have several functions and characteristics necessary for repairing a damaged well. Such fluids may be used for breaking emulsions already formed and for removing formation damage that may have occurred during the drilling, completion and/or production operations. The terms "remedial operations" and "remediate" are defined herein to include a lowering of the viscosity of gel damage and/or the partial or complete removal of damage of any type from a subterranean formation. Similarly, the term "remediation fluid" is defined herein to include any fluid that may be useful in remedial operations. A stimulation fluid may be a treatment fluid prepared to stimulate, restore, or enhance the productivity of a well, such as fracturing fluids and/or matrix stimulation fluids in one non-limiting example.

Hydraulic fracturing is a type of stimulation operation, 30 which uses pump rate and hydraulic pressure to fracture or crack a subterranean formation in a process for improving the recovery of hydrocarbons from the formation. Once the crack or cracks are made, high permeability proppant relative to the formation permeability is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path 40 connecting the producing wellbore to a larger formation area to enhance the production of hydrocarbons.

Another type of stimulation operation is one where the oil or gas well is 'unloaded'. In most gas wells, water and/or condensate is produced along with gas. In mature gas wells, decreasing formation pressures and gas velocities gradually cause the wells to become "loaded" with liquids. Because of the difficulties in treating liquid-loaded wells with higher condensate cuts, operators may use a variety of methods to prevent liquid loading in marginal gas wells.

Unloading an oil or gas well may be necessary when a primary production technique (i.e., use of only the initial formation energy to recover the crude oil), followed by the secondary technique of waterflooding, recovers only a small percentage of the original oil in place present in the formation. The average recovery factor is around 25 to 35% for oil fields and around 70% for gas fields after secondary recovery operations. Gas well production and oil well production systems are generally limited in their production due to the load of oil and water in the flowlines.

Gas lift and/or deliquification of wells may enable wells with liquid loading issues to be returned to continuous flowing status, enhance the flow of a current producing well, restart a well, and combinations thereof. Typically, as the oil and/or gas is produced from the reservoir, the pressure of the reservoir formation decreases and the production declines. In addition, the production of the well may decline over time due to completion issues, and the well may become difficult to restart. A method commonly used to deliquify or 'unload' these wells is through the application of chemical foaming agents.

The use of foam generated in situ by surfactant-alternating-gas (SAG) injection is described as a substitute for polymer drive in an alkaline/surfactant/polymer (ASP) enhanced oil recovery (EOR) process in R. F. Li, et al., "Foam Mobility Control for Surfactant Enhanced Oil Recovery," SPE 113910, SPE/DOE Symposium on 20 Improved Oil Recovery, Tulsa, Okla., SPE Journal, March, 2010.

Micellar, alkaline, soap-like substances, and the like may be used to reduce interfacial tension between oil and water in the reservoir and mobilize the oil present within the reservoir; whereas, polymers, such as polyacrylamide or polysaccharide may be employed to improve the mobility ratio and sweep efficiency, which is a measure of the effectiveness of an EOR operation that depends on the volume of the reservoir contacted by the injected fluid.

In an alternative non-limiting embodiment of the method, the method may include unloading an oil or gas well within a subterranean oil-bearing formation by introducing a foamed fluid composition into the subterranean reservoir wellbore having a pre-existing fluid therein. The foamed fluid composition may have or include a base fluid, a gas, at least one anionic surfactant, and at least one second surfactant selected from the group consisting of cationic surfactants, nonionic surfactants, zwitterionic surfactants, and combinations thereof. The at least one anionic surfactant is selected from the group consisting of sulfonate surfactants and/or sulfate surfactants, where the anionic surfactant comprises a C20-C24 carbon chain and an internal olefin. The foamed fluid composition has a salinity equal to or greater than 30,000 TDS. The surfactants are present in an amount effective to foam the composition. The method further comprises at least partially displacing the pre-existing fluid within the subterranean reservoir wellbore.

There is further provided, in another form, a foamed fluid composition having a base fluid, a gas, at least one anionic surfactant, and at least one second surfactant. The base fluid may be or include an oil-based fluid, an aqueous-based fluid, and combinations thereof. The anionic surfactant has a hydrophobic chain of at least 20 carbon atoms, where the anionic surfactant is a sulfonate surfactant, a sulfate surfactant, or combinations thereof. The anionic surfactant is present in the foamed fluid composition in an amount effective to give an IFT between about 10–1 mN/m and about 10–3 mN/m. The at least one second surfactant includes, but is not necessarily limited to, cationic surfactants, nonionic surfactants, zwitterionic surfactants, and combinations thereof. The foamed fluid composition has a salinity equal to or greater than 30,000 total dissolved solids (TDS).

In another non-limiting embodiment of the foamed fluid composition, the anionic sulfonate surfactant(s) may have or include a $C_{20}$-$C_{24}$ carbon chain and an internal olefin therein, and the amount of the at least one anionic surfactant ranges from about 1 vol % to about 50 vol % based on the total foamed fluid composition.

There is provided, in one form, a method that may include performing an operation with a foamed fluid composition. The foamed fluid composition may have or include a base fluid, a gas, at least one anionic surfactant having a hydrophobic chain of at least 20 carbon atoms, where the anionic surfactant is selected from the group consisting of sulfonate.

1. Surfactant

Suitable surfactants for use in the herbicide formulations of the present disclosure include one or more surfactants and/or co-surfactants of Formula I,

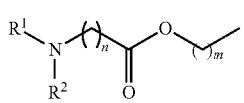

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

In particular, suitable surfactants or co-surfactants may include one or more of any of Surfactants 1-5 described herein.

2. A Second Surfactant

At least one anionic surfactant having a hydrophobic chain of 12 to 24 carbon atoms, where the anionic surfactant is selected from the group consisting of sulfonate surfactants, sulfate surfactants, and combinations thereof, and at least one second surfactant selected from the group consisting of cationic surfactants, nonionic surfactants, zwitterionic surfactants, and combinations thereof.

3. A Base Fluid

The base fluid may be an oil-based fluid or a water-based fluid selected from a group consisting of a drilling fluid, a completion fluid, a stimulation fluid, a fracturing fluid, a gas well deliquification fluid, a coiled tubing operations fluid, a recycled drilling fluid, a servicing fluid, a well clean-out fluid, a well intervention fluid, a capillary coiled tubing fluid and combinations thereof.

4. A Gas

Any suitable gas known in the art can be admixed with any appropriate liquid portion of the liquid formulation. Such gases include, but are not limited to, air, nitrogen carbon dioxide, natural gas, and any combination thereof.

IV. Fluids for Recovering Bio Oils

Bio based oils include edible oils from naturally occurring sources are a staple of human nutrition and until relatively recently a source of light and even energy. Naturally occurring sources of oil include seeds, and fruits, some which are cultivated essentially as sources of oil. Sources of bio based oils that may be used for fuel including bio diesel fuel include soybeans naturally occurring and bio-engineered algae. Any formulations and/or processes that can be used to increase the recovery and/or quality of the recovered oils is beneficial.

Other sources of bio based oils include stillage from the fermentation of feed stocks such a corn and from the processing of oil rich plants such soybeans and algae. Some embodiments of the invention include formulations for aiding in the extraction of an emulsified oil from an oil and water emulsion. The composition may include a non-ionic surfactant selected from alkoxylated plant oils, alkoxylated plant fats, alkoxylated animal oils, alkoxylated animal fats, alkyl poly glucosides, alkoxylated glycerols, and mixtures thereof. The composition may include silicon containing particles. Some methods for recovering oil from a corn to ethanol process is also provided. These methods may include the steps of adding the composition to a process stream of the corn to ethanol process, and extracting oil from the process stream.

Formulations for the recovery of edible oil include only reagents characterized as generally regarded as safe (GRAS) by regulatory agencies such as the United States Department of Agriculture and the United States Food and Drug Administration.

Sources of bio based oils that may be used for fuel including bio diesel fuel include soybeans naturally occurring and bio-engineered algae.

(New paragraph or part of previous?) Most commercial corn oil is produced by front end fractionation of corn germ during the wet mill corn process. Recently, a new source of corn oil has arisen as a by-product of the dry-mill process used in the ethanol industry. Dry milling is a process requiring less energy and less capital investment than wet-milling. Though corn oil captured at the tail-end of a dry mill process is not suitable for food use, it can be used as a biodiesel feedstock.

1 Aqueous Components

The aqueous component may include for example, fresh water, sea water, most commonly the aqueous phase comprises water that includes one or more inorganic salts.

2. Supercritical Gases

Some inventive foams include super critical gasses, for example, carbon dioxide. Supercritical carbon dioxides ($CO_2$) is a fluid state of the gas wherein the gas is held at or above its critical temperate and critical pressure. Gases in this state exhibit some properties midway been the properties of a gas and a liquid. Supercritical carbon dioxide exists at a temperature at or above about 31.1° C. and a pressure above about 7.39 MPa.

3. Surfactants

Suitable surfactants for use in the herbicide formulations of the present disclosure include one or more surfactants and/or co-surfactants of Formula I,

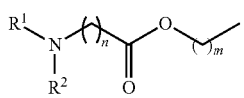

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

In particular, suitable surfactants or co-surfactants may include one or more of any of Surfactants 1-5 described herein.

The aforementioned surfactants can be combines with other surfactant including for example, sulfosuccinaamate type surfaces of the formula:

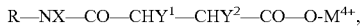

wherein $Y^1$ is H and $Y^2$ is ($SO_3M^{3+}$, or $Y^{-1}$ is ($SO_3M^{3+}$) and $Y^2$ is H. $M^{3+}$ and $M^{4+}$ are cations, and may be the same or may be different, and are selected from groups 1 and 2 of the Periodic Table of the Elements, consisting of the alkali metals, and the earth alkali metals, preferably from $Li^+$, $Na^+$, $K^+$, and also from ammonium $NH^{4+}$; R is a linear or branched or cyclic aliphatic radical having from eight to twenty-four carbon atoms, and optionally, one or more carbon-carbon double bonds, or a mixture of two or more of Such radicals. X can be a hydrogen atom, or can be an alkylcarboxylate group—(CRR)-$COOM^{2+}$, where R' and R may both by H, or R is H, and R is —CH COO $M^{3+}$, where $M^{3+}$, and $M^+$, are cations, and may be the same or may be different, and are selected from groups 1 and 2 of the Periodic Table of the Elements, consisting of the alkali metals, and the earth alkali metals, preferably from Li, $Na^+$, $K^+$, and also from ammonium NH. Particularly preferred alkali metal ions for $M^{3+}$, $M^+$, $M^{2+}$, and $M^{4+}$ are, independently from each other, the sodium cation, $Na^+$, and the potassium cation, $K^+$.

Still other surfactants optionally included in the indicated separation aid composition can be, for example, nonionic surfactants, cationic surfactants, or anionic surfactants. The surfactant (which can be one or more) can be a nonionic surfactant, for example, ethoxylated castor oil, an ethoxylated sorbitan ester, a PEG, a poloxamer, an acetylenic glycol, or a sulfonate, or combinations thereof. The nonionic surfactants can be, for example, nonionic polyethylene glycols, such as ethoxylate of carboxylic acids, ethoxylate of mono-, di- or triglycerides, ethoxylate of mono-, di- or triesters of sorbitan or ethoxylate of fatty alcohols. The ethoxylated sorbitan esters can be commercially obtained as TWEEN or polysorbate series surfactant. Other suitable nonionic surfactants are mono-, di- or triglycerides based on fatty acids having 12-22 carbon atoms, or mono-, di- or triesters of sorbitan based on fatty acids having 12-22 carbon atoms. Commercial sources of the nonionic Surfactant which can be used in separation aids of the present invention include, for example, Lumisorb Polysorbates from Lambent Technologies Corporation (Gurnee, Ill. USA). The nonionic surfactant may be at least one poloxamer. Poloxamers can be nonionic triblock copolymers that comprise a central block of a hydrophobic poly alkyleneoxide block, which is flanked on both sides with hydrophilic polyalkyleneoxide blocks. Poloxamers are commercially available that are food grade. A commercial Source of poloxamers are, for example, PLURONIC®copolymers from BASF Corporation (Florham Park, N.J., U.S.A.).

The water solubility of the surfactants, such as the nonionic surfactants, can be related to their hydrophilic-lipophilic balance (HLB) value or number. The nonionic surfactants can have an HLB value of at least about 6, or at least about 9, or at least about 12, or from about 6 to 20, or from about 7 to about 19, or from about 8 to about 18, or from about 9 to about 17, or from about 10 to about 16, or other values. The water solubility of nonionic surfactants can be related to their hydrophilic-lipophilic balance (HLB) value or number. The HLB value can be calculated in a conventional manner. For example, the HLB value of a nonionic surfactant can be calculated by dividing the molecular weight percent of the hydrophilic portion of the nonionic surfactant by five. For example, a nonionic surfactant containing 80 mole 96 hydrophilic portion (total) would have an HLB value calculated to be 16 (i.e., 80/5-16). HLB values that exceed 20 are relative or comparative values.

Some inventive formulations may include one or more surfactants in an amount of about 0 wt. % or greater, about 2 wt. % or greater, about 4 wt. % or greater, about 6 wt. % or greater, about 8 wt. % or greater, or about 10 wt. % or lower, about 12 wt. % or lower, about 14 wt. % or lower, about 16 wt. % or lower, or within any range using these endpoints.

4. Oils

Oils that may be used to practice the invention include, alkoxylated plant oils selected from the group consisting of ethoxylated castor oil, ethoxylated soy-bean oil, ethoxylated palm kernel oil, ethoxylated almond oil, ethoxylated corn oil, ethoxylated canola oil, ethoxylated rapeseed oil, and ethoxylated coconut oil.

The oil included in the indicated separation aid can be, for example, mineral oil, triglyceride vegetable oil, hydrocarbon oil, or any combination thereof. The mineral oil can be, for example, white mineral oil or mineral seal oil. Examples of the mineral oil can be the atmospheric residue oil obtained in the distillation of crude oil, vacuum gas oil, and vacuum residue oil obtained by vacuum distillation of the atmospheric residue oil, their hydrotreated oils, pyrolysis oils, and or their mixtures. Among these mineral oils, the atmospheric residue oil, vacuum residue oil, and their hydrotreated products or pyrolysis products are referred to as residue oils in the present invention. The triglyceride vegetable oil can be, for example, triglyceride corn oil. The hydrocarbon oil can be, for example, white mineral oil, or any combinations thereof. Commercial sources of the oil which can be used in separation aids of the present invention include, for example, Clarion White Mineral Oil 70, CITGO Petroleum (Houston, USA).

5. Lecithin

The lecithin used in the separation aid can be natural origin, modified origin, or synthetic. The lecithin which can be used in the present invention can be lecithin derived from any plant, animal or microbial source. Suitable lecithin starting materials are commercially available, and include available soybean lecithin and yolk lecithin products. Lecithin can be obtained from natural sources such as egg yolk, and plants such as soybean, maize, rapeseed, and the like where it is a by-product of vegetable oil refinement. Soybean oil is the largest source of commercial lecithin. The composition of commercial lecithin depends on the source, methods of preparation, and degree of purification, but in the purest form it is comprised of mainly phosphatides. Commercial lecithin, for example, is a co-product of oil processing obtained during degumming step. For example, soybean lecithin is a complex mixture and comprises of phospholipids and triglycerides, with minor amounts of other constituents like phytoglycolipids, phytosterols, tocopherols and fatty acids. The major phospholipids present in vegetable lecithins are phosphatidylcholine, phosphatidylethanolamine and phosphatidylinositol. The egg yolk lecithin contains phosphatidyl choline and phosphatidylethanolamine as major phospholipids. Lecithin can be extracted chemically (using hexane) or mechanically from readily available sources such as soy beans. Lecithin has low solubility in water. In aqueous solution, its phospholipids can form either liposomes, bilayer sheets, micelles, or lamellar structures, depending on hydration and temperature. This results in a type of material that is usually classified as amphipathic. As used herein, "modified lecithin" refers to, but is not limited to, acetylation, hydroxylation, hydrogenation, hydrolysis products of lecithin, chlorination, bromination, iodination, halogenation, phosphorylation and sulfonation, as well as any other modification known to those in the art. Acetylated lecithins can be produced, for example, using a carboxylic acid anhydride like acetic anhydride for the acetylation of phospholipids from vegetable lecithins, such as shown in U.S. Pat. No. 3,301,881 which is incorporated herein by reference in its entirety. An enzymatic process can be used for the preparation of an acetylated phospholipid from vegetable lecithins such as soy bean lecithin, rapeseed lecithin, and animal lecithins like egg yolk lecithin or pure phosphatidylethanolamine isolated from the above lecithins. Commercial lecithins can be acetylated, for example, by using vinyl acetate as acylating agent in presence of lipase from Mucor-Miehei having 1.3-position specificity as catalyst, such as shown in U.S. Pat. No. 6,403,344, which is incorporated herein by reference in its entirety. In acetylated lecithin, for example, acetylation occurs primarily on the amino group of phosphatidylethanolamine. The extent of acetylation on the modified lecithin, if used, can be partial or complete. The extent of acetylation on a modified lecithin can be, for example, from about 5% to 100%, or from about 10% to about 99%, or from about 15% to about 95%, or from about 20% to about 90%, or from about 25% to about 75%, or other values. Lecithin additionally contains a number of chemical functional groups that make it susceptible to a variety of chemical reactions. These groups include carbon-carbon double bonds, esters, phosphonate esters, amines and hydroxyl groups. Modification may also result in interest-erified lecithin. Additionally, lecithins may be enzyme modified. As used herein, "phosphatides" (Phospholipids) refers to, but are not limited to, mixtures of phosphatidylcholine, phosphatidyl ethanolamine, phosphatidyl serine, phosphatidyl inositol, phosphatidic acid, N-acylphosphatidylethanolamine and other related minor constituents. Commercial sources of lecithin or modified lecithin which can be used in separation aids of the present invention include, for example, Solec $HR^2B$ from Solae LLC (Memphis, Tenn. USA).

6. Silica

For example, the separation aid can contain silica, such as fumed silica. The fumed silica can be hydrophobic or hydrophilic. Fumed silica is food grade and can be more desirable for this reason. Fused, fumed silica can be contained in the separation aid in an amount, for example, of from about 1 wt % to 10 wt %.

7. Water-Insoluble Solvents and Oils

Suitable water-insoluble immiscible organic solvents include those derived from or made from natural, non-petroleum sources such as, for example, plants and animals, and include, vegetable oils, seed oils, animal oils and the like, such N,N-dimethylcaprylamide (N,N-dimethyloctanamide), N,N-dimethylcapramide (N,N-dimethyldecanamide), and mixtures thereof, which are available commercially as Agnique® AMD 810 and Agnique® AMD 10, from BASF Corp. (Florham Park, N.J.), Genegen® 4166, Genegen® 4231 and Genegen® 4296, from Clariant (Charlotte, N.C.), Hallcomid M-8-10 and Hallcomid M-10, from Stepan (Northfield, Ill.), and Amid DM10 and DM810 from AkzoNobel (Chicago, Ill.). Additional examples of naturally derived organic solvents include the morpholine amides of caprylic/capric fatty acids (C8/C10) which are commercially available as JEFFSOL® AG-1730 Solvent from Huntsman International LLC (The Woodlands, Tex.).

Other suitable water-insoluble solvents may include aromatic hydrocarbons, mixed naphthalene and alkyl naphthalene fractions, aromatic solvents, particularly alkyl substituted benzenes such as xylene or propylbenzene fractions, and the like; $C_1$-$C_6$ esters of fatty acids derived from vegetable, seed or animal oils such as, methyl caproate, methyl caprylate, methyl caprate, methyl laurate, methyl myristate, methyl palmitate, methyl stearate, methyl oleate, methyl linoleate, methyl linolenate, and the like; ketones such as isophorone and trimethylcyclohexanone (dihydroisophorone); acetate esters such as, methyl, ethyl, propyl, butyl, pentyl, hexyl, or heptyl acetate, and the like; and cyclic alkyl carbonates such as propylene carbonate and butylene carbonate, which are available as the JEFFSOL® alkylene carbonates from Huntsman (The Woodlands, Tex.), and dibutyl carbonate, also from Huntsman, and mixtures of any of the water immiscible organic solvents described herein.

The water-insoluble solvent may be present in the herbicidal formulation in an amount of about 0 wt. % or greater, about 10 wt. % or greater, about 20 wt. % or greater, or about 30 wt. % or lower, about 40 wt. % or lower, about 50 wt. % or lower, or within any range using these endpoints.

8. Water

Water may be present in the formulations of the present disclosure to serve as both an aqueous solvent and a carrier for the ingredients in the described compositions. Some formulations of the present disclosure may include water in an amount of about 200 g/L or greater, about 300 g/L or greater, about 400 g/L or greater, or about 500 g/L or lower, about 600 g/L or lower, about 700 g/L or lower, about 800 g/L or lower, or within any range using these endpoints.

9. Other Additives

The herbicidal formulation may include one or more additional compatible ingredients. These additional ingredients may include, for example, one or more pesticides or other ingredients, which may be dissolved or dispersed in the composition and may be selected from acaricides, algicides, antifeedants, avicides, bactericides, bird repellents, chemosterilants. Also, any other additional ingredients providing functional utility such as, for example, antifoam agents, antimicrobial agents, buffers, corrosion inhibitors, dispersing agents, dyes, fragrants, freezing point depressants, neutralizing agents, odorants, penetration aids, sequestering agents, stabilizers, sticking agents, viscosity-modifying additives, water soluble solvents and the like, may be included in these compositions.

When the formulations are used in combination with the additional active ingredients such as, the compositions described herein can be formulated with the other active ingredient or active ingredients as premix concentrates, tank-mixed in water with the other active ingredients.

10. Method of Making

The formulations of the present disclosure may be prepared by the steps of: 1) preparing a solution of in an organic solvent and a surfactant; 2) adding the solution prepared in step 1) to a concentrated solution of a water-soluble salt in water with good mixing to form a clear solution; and 3) optionally, adding any additional compatible active or inert ingredients.

Alternatively, the formulations of the present disclosure may be prepared by the steps of: 1) providing an oil, optionally, mixing it with the organic solvent and a surfactant; 2) adding the composition prepared in step 1) to a concentrated solution of a water-soluble salt with good mixing to form a clear solution; and 3) optionally, adding any additional compatible active or inert ingredients.

Suitable water compatible ingredients that may be added to the formulations include, but are not limited to, water soluble or water insoluble dispersing surfactants, such as the surfactants of the present disclosure, water insoluble active ingredients and optionally, other inert ingredients such as pH buffers, wetting agents, antifreeze agents, antifoam agents, and biocides.

11. Method of Use

The solution may be added to naturally occurring sources of oil such as soy bean mash, or algae bio-mass, or to synthetic sources of oils such as stillage from corn ethanol producing processes. Once mixed with the source of bio oil may be separated from the oil sources by any means known in the art including, for example, settling, heating, cooling, freezing, and the like.

IV. Surfactants

The present disclosure provides surfactants for use in agricultural products in the form of derivatives of amino acids. The amino acids may be naturally occurring or synthetic, or they may be obtained from ring-opening reactions of lactams, such as caprolactam. The compounds of the present disclosure have been shown to have surface-active properties, and may be used as surfactants and wetting agents, for example. In particular, the present disclosure provides compounds of Formula I,

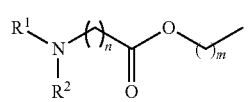

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

One specific compound provided by the present disclosure is 6-(dodecyloxy)-N,N,N-trimethyl-6-oxohexan-1-aminium iodide (Surfactant 1), having the following formula:

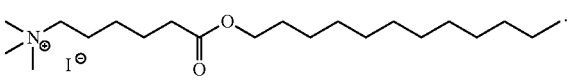 [SMILES: CCCCCCCCCCCCOC(=O)CCCCC[N+](C)(C)C ; [I-]]

A second specific compound provided by the present disclosure is dodecyl 6-(dimethylamino)hexanoate N-oxide (Surfactant 2), having the following formula:

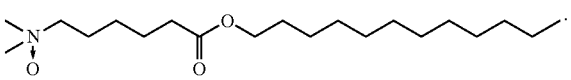 [SMILES: CCCCCCCCCCCCOC(=O)CCCCC[N+](C)(C)[O-]]

In the structure above, the notation "NO→" is intended to convey a non-ionic bonding interaction between nitrogen and oxygen.

A third specific compound provided by the present disclosure is 6-(dodecyloxy)-N,N-dimethyl-6-oxohexan-1-aminium chloride (Surfactant 3), having the following formula:

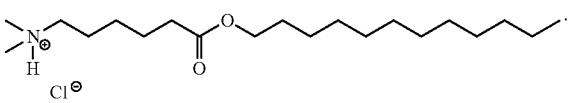 [SMILES: CCCCCCCCCCCCOC(=O)CCCCC[NH+](C)C ; [Cl-]]

A fourth specific compound provided by the present disclosure is 4-((6-(dodecyloxy)-6-oxohexyl)dimethylammonio)butane-1-sulfonate (Surfactant 4), having the following formula:

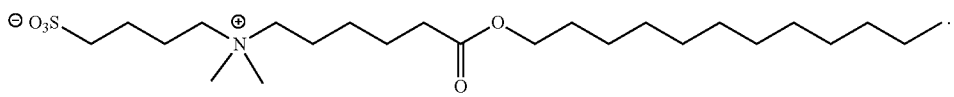

A fifth specific compound provided by the present disclosure is 6-(dodecyloxy)-6-oxohexan-1-aminium chloride (Surfactant 5), having the following formula:

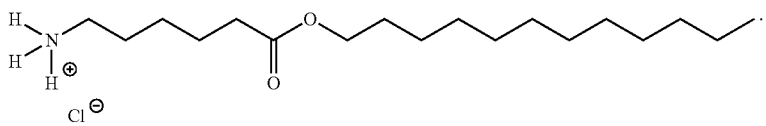

These surfactants may be synthesized by various methods. One such method includes opening a lactam to yield an amino acid having an N-terminus and C-terminus. The N-terminus may be reacted with one or more alkylating agents and/or an acid to yield a quaternary ammonium salt. Alternatively, the N-terminus may be reacted with an oxidizing agent to yield an amine N-oxide. The C-terminus may be reacted with an alcohol in the presence of an acid to yield an ester.

The amino acid may be naturally occurring or synthetic or may be derived from a ring opening reaction of a lactam, such as caprolactam. The ring-opening reaction may be either an acid or alkali catalyzed reaction, and an example of an acid catalyzed reaction is shown below in Scheme 1.

SCHEME 1

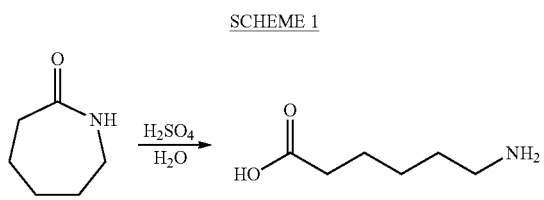

The amino acid may have as few as 1 or as many as 12 carbons between the N- and C-terminii. The alkyl chain may be branched or straight. The alkyl chain may be interrupted with nitrogen, oxygen, or sulfur. The alkyl chain may be further substituted with one or more substituents selected from the group consisting of hydroxyl, amino, amido, sulfonyl, sulfonate, carboxyl, and carboxylate. The N-terminal nitrogen may be acylated or alkylated with one or more alkyl groups. For example, the amino acid may be 6-(dimethylamino)hexanoic acid.

Surfactant 1 may be synthesized as shown below in Scheme 2. As shown, 6-aminohexanoic acid is treated with formaldehyde in formic acid at reflux to give 6-(dimethylamino)hexanoic acid. The free carboxylic acid is then treated with an alcohol, such as dodecanol, in the presence of p-toluene sulfonic acid (PTSA) in toluene to give the corresponding ester, dodecyl 6-(dimethylamino)hexanoate. The N-terminus is then alkylated with methyl iodide in the presence of sodium carbonate.

SCHEME 2

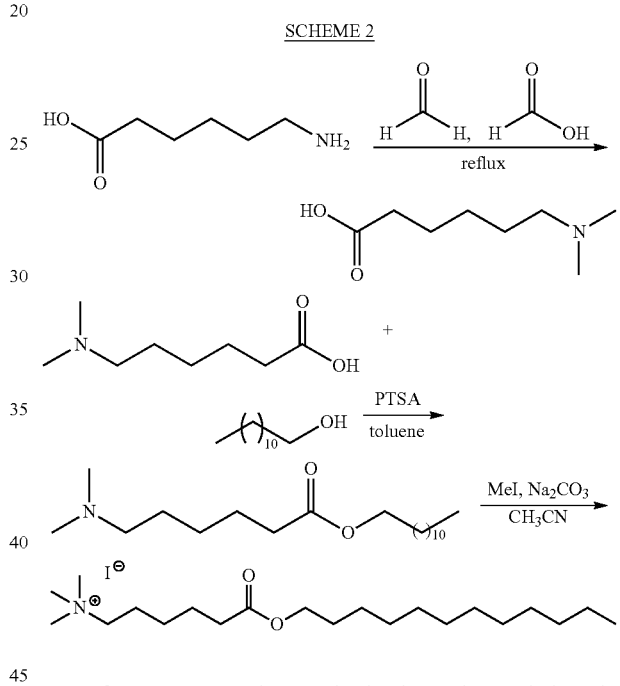

Surfactant 2 may be synthesized as shown below in Scheme 3. As shown, 6-aminohexanoic acid is treated with formaldehyde in formic acid at reflux to give 6-(dimethylamino)hexanoic acid. The free carboxylic acid is then treated with an alcohol, such as dodecanol, in the presence of p-toluene sulfonic acid (PTSA) in toluene to give the corresponding ester, dodecyl 6-(dimethylamino)hexanoate. The N-terminus is then oxidized with hydrogen peroxide to give the amine oxide.

SCHEME 3

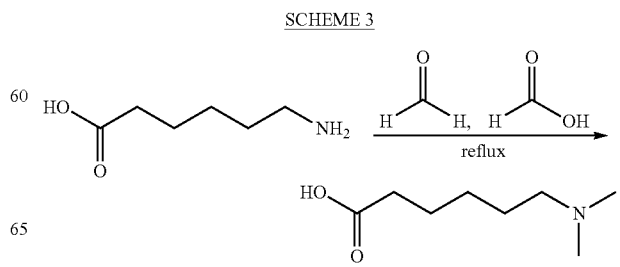

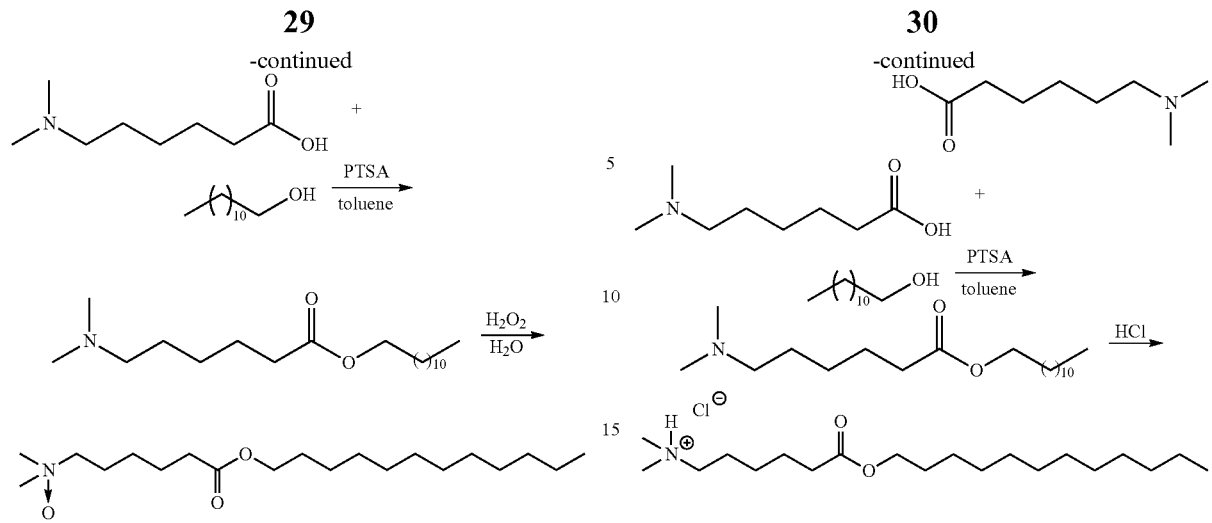

Surfactant 3 may be synthesized as shown below in Scheme 4. As shown, 6-aminohexanoic acid is treated with formaldehyde in formic acid at reflux to give 6-(dimethylamino)hexanoic acid. The free carboxylic acid is then treated with an alcohol, such as dodecanol, in the presence of p-toluene sulfonic acid (PTSA) in toluene to give the corresponding ester, dodecyl 6-(dimethylamino)hexanoate.

Surfactant 4 may be synthesized as shown below in Scheme 5. As shown, 6-aminohexanoic acid is treated with formaldehyde in formic acid at reflux to give 6-(dimethylamino)hexanoic acid. The free carboxylic acid is then treated with an alcohol, such as dodecanol, in the presence of p-toluene sulfonic acid (PTSA) in toluene to give the corresponding ester, dodecyl 6-(dimethylamino)hexanoate. The N-terminus is then treated with 1,4-butanesultone in refluxing ethyl acetate to yield the desired sulfonate.

SCHEME 5

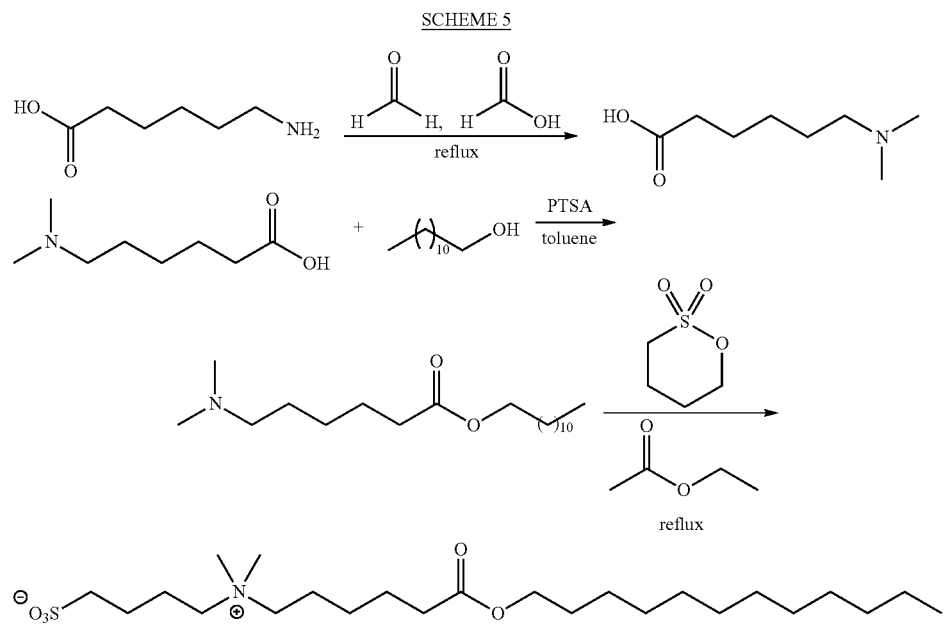

The N-terminus is then alkylated with methyl iodide in the presence of sodium carbonate.

Surfactant 5 may be synthesized as shown below in Scheme 6. As shown, 6-aminohexanoic acid is reacted with an alcohol, in the presence of p-toluene sulfonic acid (PTSA) in toluene to give the corresponding ester, dodecyl 6-aminohexanoate. The N-terminus is protonated with hydrochloric acid to give the desired hydrochloride salt.

SCHEME 4

SCHEME 6

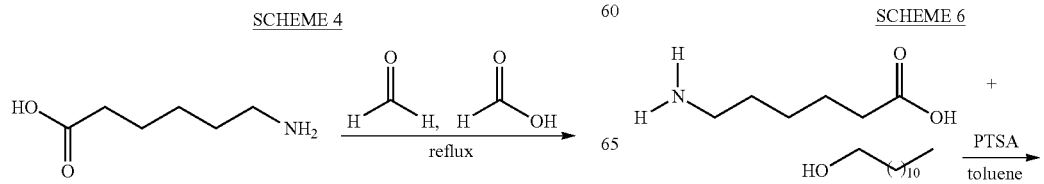

-continued

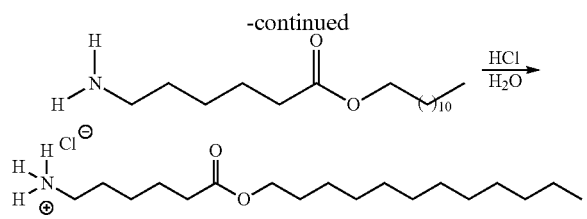

The compounds of the present disclosure demonstrate surface-active properties. These properties may be measured and described by various methods. One method by which surfactants may be described is by the molecule's critical micelle concentration (CMC). CMC may be defined as the concentration of a surfactant at which micelles form, and above which all additional surfactant is incorporated into micelles.

As surfactant concentration increases, surface tension decreases. Once the surface is completely overlaid with surfactant molecules, micelles begin to form. This point represents the CMC, as well as the minimum surface tension. Further addition of surfactant will not further affect the surface tension. CMC may therefore be measured by observing the change in surface tension as a function of surfactant concentration. One such method for measuring this value is the Wilhelmy plate method. A Wilhelmy plate is usually a thin iridium-platinum plate attached to a balance by a wire and placed perpendicularly to the air-liquid interface. The balance is used to measure the force exerted on the plate by wetting. This value is then used to calculate the surface tension (γ) according to Equation 1:

$$\gamma = F/l \cos\theta \quad \text{Equation 1:}$$

wherein l is equal to the wetted perimeter (2w+2d, in which w and d are the plate thickness and width, respectively) and cos θ, the contact angle between the liquid and the plate, is assumed to be 0 in the absence of an extant literature value.

Another parameter used to assess the performance of surfactants is dynamic surface tension. The dynamic surface tension is the value of the surface tension for a particular surface or interface age. In the case of liquids with added surfactants, this can differ from the equilibrium value. Immediately after a surface is produced, the surface tension is equal to that of the pure liquid. As described above, surfactants reduce surface tension; therefore, the surface tension drops until an equilibrium value is reached. The time required for equilibrium to be reached depends on the diffusion rate and the adsorption rate of the surfactant.

One method by which dynamic surface tension is measured relies upon a bubble pressure tensiometer. This device measures the maximum internal pressure of a gas bubble that is formed in a liquid by means of a capillary. The measured value corresponds to the surface tension at a certain surface age, the time from the start of the bubble formation to the occurrence of the pressure maximum. The dependence of surface tension on surface age can be measured by varying the speed at which bubbles are produced.

Surface-active compounds may also be assessed by their wetting ability on solid substrates as measured by the contact angle. When a liquid droplet comes in contact with a solid surface in a third medium, such as air, a three-phase line forms among the liquid, the gas and the solid. The angle between the surface tension unit vector, acting at the three-phase line and tangent at the liquid droplet, and the surface is described as the contact angle. The contact angle (also known as wetting angle) is a measure of the wettability of a solid by a liquid. In the case of complete wetting, the liquid is completely spread over the solid and the contact angle is 0°. Wetting properties are typically measured for a given compound at the concentration of 1-100×CMC, however, it is not a property that is concentration-dependent therefore measurements of wetting properties can be measured at concentrations that are higher or lower.

In one method, an optical contact angle goniometer may be used to measure the contact angle. This device uses a digital camera and software to extract the contact angle by analyze the contour shape of a sessile droplet of liquid on a surface.

Potential applications for the surface-active compounds of the present disclosure include formulations for use as shampoos, hair conditioners, detergents, spot-free rinsing solutions, floor and carpet cleaners, cleaning agents for graffiti removal, wetting agents for crop protection, adjuvants for crop protection, and wetting agents for aerosol spray coatings.

It will be understood by one skilled in the art that small differences between compounds may lead to substantially different surfactant properties, such that different compounds may be used with different substrates, in different applications.

The following non-limiting embodiments are provided to demonstrate the different properties of the different surfactants. In Table 1 below, short names for the surfactants are correlated with their corresponding chemical structures.

TABLE 1

| Surfactant | Formula & Name |
| --- | --- |
| Surfactant 1 | 6-(Dodecyloxy)-N,N,N-trimethyl-6-oxohexan-1-aminium iodide |
| Surfactant 2 | Dodecyl 6-(dimethylamino)hexanoate N-oxide |

TABLE 1-continued

| Surfactant | Formula & Name |
|---|---|
| Surfactant 3 | 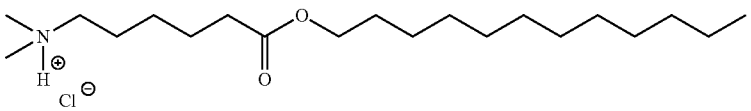
6-(Dodecyloxy)-N,N-dimethyl-6-oxohexan-1-aminium chloride |
| Surfactant 4 | 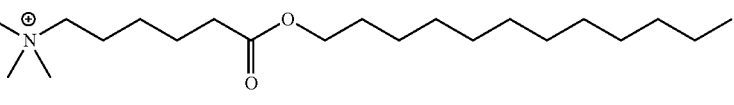
4-((6-(Dodecyloxy)-6-oxohexyl)dimethylammonio)butane-1-sulfonate |
| Surfactant 5 | 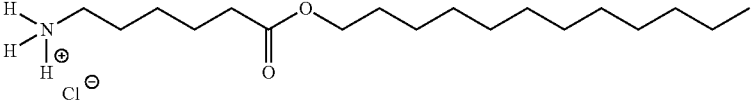
6-(Dodecyloxy)-6-oxohexan-1-aminium chloride |

Each of the five compounds are effective as surface-active agents, useful for wetting or foaming agents, dispersants, emulsifiers, and detergents, among other applications.

Surfactant 1, Surfactant 3, and Surfactant 5 are cationic. These surfactants are useful in both the applications described above and some further special applications such as surface treatments, such as in personal hair care products, and can also be used to generate water repellant surfaces.

Surfactant 4 is non-ionic, and can be used in shampoos, detergents, hard surface cleaners, and a variety of other surface cleaning formulations.

Surfactant 5 is zwitterionic. These surfactants are useful as co-surfactants in all of the applications described above.

The amount of the compounds disclosed herein used in a formulation may be as low as about 0.001 wt. %, about 0.05 wt. %, about 0.1 wt. %, about 0.5 wt. %, about 1 wt. %, about 2 wt. %, or about 5 wt. %, or as high as about 8 wt. %, about 10 wt. %, about 15 wt. %, about 20 wt. %, or about 25 wt. %, or within any range using any two of the foregoing values.

EXAMPLES

Nuclear magnetic resonance (NMR) spectroscopy was performed on a Bruker 500 MHz spectrometer. The critical micelle concentration (CMC) was determined by the Wilhelmy plate method at 23° C. with a tensiometer (DCAT 11, DataPhysics Instruments GmbH) equipped with a Pt-Ir plate. Dynamic surface tension was determined with a bubble pressure tensiometer (KrOss BP100, Krüss GmbH), at 23° C. Contact angle was determined with the optical contact angle goniometer (OCA 15 Pro, DataPhysics GmbH) equipped with a digital camera.

Example 1a

Synthesis of 6-(dodecyloxy)-N,N,N-trimethyl-6-oxohexan-1-aminium iodide (Surfactant 1)

6-(Dimethylamino)hexanoic acid (11.99 g, 75.36 mmol) was dissolved in toluene (50 mL) in a round bottom flask equipped with a Dean-Stark trap. Dodecanol (12.68 g, 75.36 mmol) and p-toluene sulfonic acid monohydrate (PTSA) (14.33 g, 75.36 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-(dimethylamino)hexanoate in 51% yield. 1H NMR (DMSO) δ 4.00 (t, J=6.5 Hz, 2H), 2.27 (t, J=7.3 Hz, 2H), 2.13-2.16 (m, 2H), 2.01 (s, 6H), 1.54-1.53 (m, 6H), 1.27-1.18 (m, 20H), 0.86 (t, 3H).

Dodecyl 6-(dimethylamino)hexanoate (1.0 g, 3.05 mmol) was dissolved in acetonitrile (10 mL). Sodium carbonate (0.388 g, 3.66 mmol) was then added, and the reaction was stirred at room temperature for 10 minutes. Methyl iodide (0.57 mL, 9.16 mmol) was added, and the reaction mixture was heated to 40° C. for 24 hours, then cooled to room temperature. The mixture was filtered and concentrated to give 6-(dodecyloxy)-N,N,N-trimethyl-6-oxohexan-1-aminium iodide as a yellow solid in 92% yield. $^1$H NMR (DMSO) δ 4.00 (t, J=6.7 Hz, 2H), 3.30-3.22 (m, 2H), 3.04 (s, 9H), 2.34 (t, J=7.4 Hz, 2H), 1.70-1.63 (m, 2H), 1.62-1.46 (m, 4H), 1.31-1.20 (m, 20H), 0.86 (t, J=6.9 Hz, 3H).

Example 1b

Determination of Critical Micelle Concentration (CMC) of Surfactant 1

The critical micelle concentration (CMC) was tested. From the change in surface tension with concentration in water, the CMC was determined to be about 1 mmol. The plateau value of minimum surface tension that can be reached by this surfactant is about 33 mN/m, namely 33 mN/m±3.3 mN/m. FIG. 1 is a plot of these results, showing surface tension versus concentration. From the plot, the surface tension is about 34 mN/m the CMC and is about 33.8 mN/m at a concentration of 1.0 mmol or greater.

Example 1c

Determination of Dynamic Surface Tension of Surfactant 1

Figure 2:
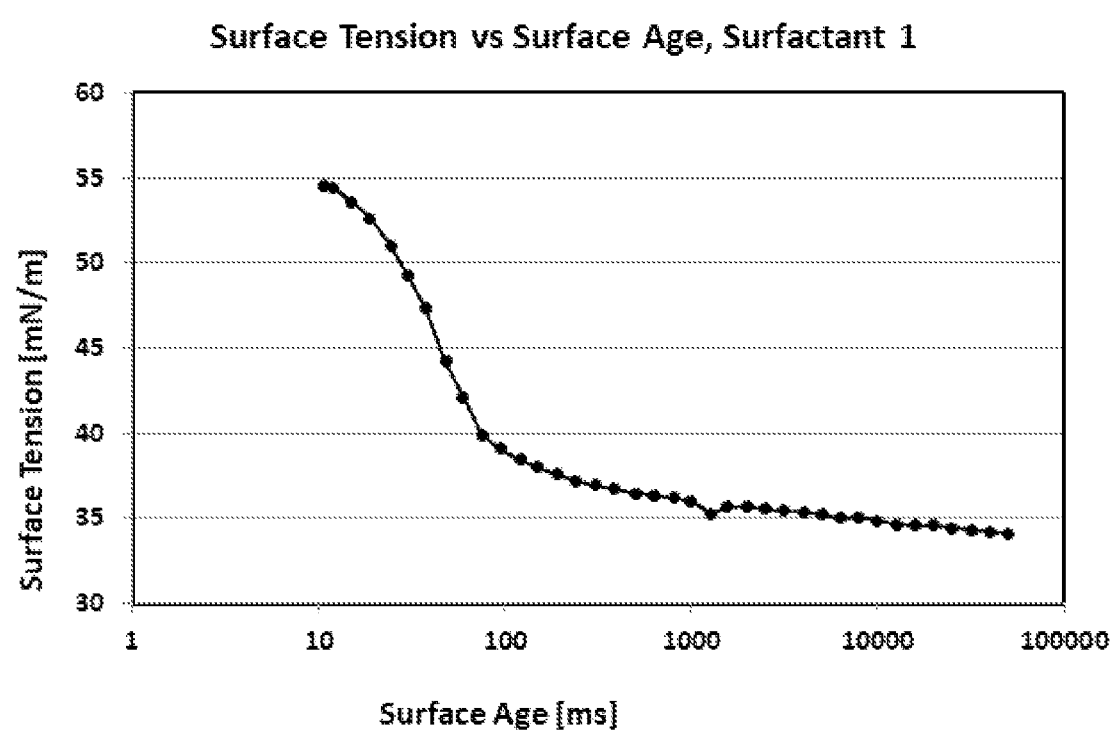
FIG. 2 shows a plot of dynamic surface tension as change in surface tension versus time for Surfactant 1 as described in Example 1c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 2 present a plot of the results as surface tension versus time, showing that surface tension in the time interval between 1 ms and 75 ms drops rapidly from about 55.5 mN/m to about 39.9 mN/m. In the time interval between 75 ms and 50,410 ms, the surface tension drops slowly from about 39.9 mN/m to about 34 mN/m, approaching asymptotically the saturation value of the surface tension at the CMC.

Example 1d

Determination of Wetting Properties of Surfactant 1

In addition to surface tension and surface dynamics, the wetting properties of the compound were tested on various surfaces. For example, hydrophobic substrates such as polyethylene-HD exhibit surface wetting with a contact angle of 32°. On oleophobic and hydrophobic substrates such as Teflon, the measured contact angle was much less than that of water, 67.1° (Table 2).

TABLE 2

| Substrate | CA of Surfactant (°) | Concentration | CA of water (°) |
|---|---|---|---|
| Teflon | 67.1 | 10× CMC | 119 |
| Polyethylene-HD | 32 | 10× CMC | 93.6 |
| Nylon | 31.5 | 10× CMC | 50 |
| Polyethylene terephthalate | 38.4 | 10× CMC | 65.3 |

Example 2a

Synthesis of dodecyl 6-(dimethylamino)hexanoate N-oxide (Surfactant 2)

6-(Dimethylamino)hexanoic acid (11.99 g, 75.36 mmol) was dissolved in toluene (50 mL) in a round bottom flask equipped with a Dean-Stark trap. Dodecanol (12.68 g, 75.36 mmol) and p-toluene sulfonic acid monohydrate (PTSA) (14.33 g, 75.36 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-(dimethylamino)hexanoate in 51% yield. $^1$H NMR (DMSO) δ 4.00 (t, J=6.5 Hz, 2H), 2.27 (t, J=7.3 Hz, 2H), 2.13-2.16 (m, 2H), 2.01 (s, 6H), 1.54-1.53 (m, 6H), 1.27-1.18 (m, 20H), 0.86 (t, 3H).

Dodecyl 6-(dimethylamino)hexanoate (1.0 g, 3.05 mmol) was dissolved in distilled water (80 mL). Hydrogen peroxide (50% solution, 1.04 g, 30.5 mmol) was added. The reaction was heated at reflux for 12 hours, then the solvent was removed under vacuum. The resultant solid was washed with acetone to give the desired N-oxide in 90% yield. $^1$H NMR (500 MHz, DMSO) δ 4.00 (t, J=6.6 Hz, 2H), 3.30-3.26 (m, 2H), 3.18 (s, 6H), 2.31 (t, J=7.4 Hz, 2H), 1.76-1.73 (m, 2H), 1.54-1.57 (m, 4H), 1.30-1.24 (m, 22H), 0.86 (t, J=6.9 Hz, 3H).

Example 2b

Determination of Critical Micelle Concentration (CMC) of Surfactant 2

Figure 3:
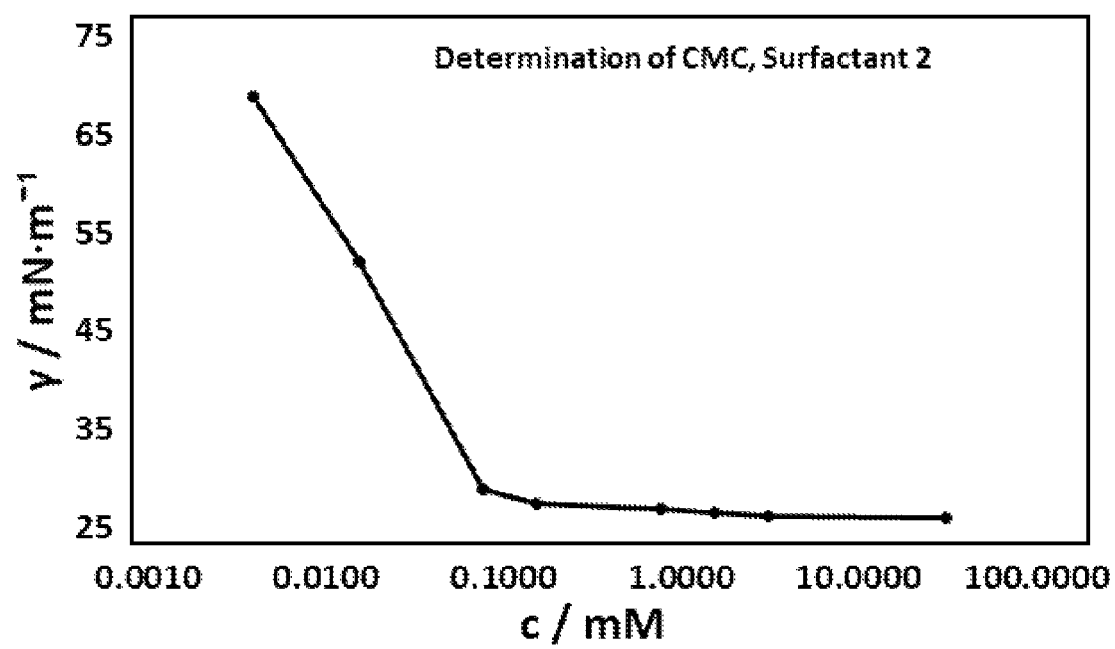
FIG. 3 shows a plot of surface tension versus concentration for Surfactant 2 measured at pH=7 as described in Example 2b, wherein the Y axis depicts the surface tension (γ) in millinewtons per meter (mN/m) and the X axis depicts the concentration (c) in millimoles (mM).

The critical micelle concentration (CMC) was tested. From the change in surface tension with concentration in water, the CMC was determined to be about 0.08 mmol. The plateau value of minimum surface tension that can be reached by this surfactant is about 28 mN/m, namely 28 mN/m±2.8 mN/m. FIG. 3 is a plot of these results, showing surface tension versus concentration. From the plot of the results, the surface tension at the CMC is equal to or less than about 30 mN/m. The plot further shows surface tension of equal to or less than 30 mN/m at a concentration of 0.08 mmol or greater.

Example 2c

Determination of Dynamic Surface Tension of Surfactant 2

Figure 4:
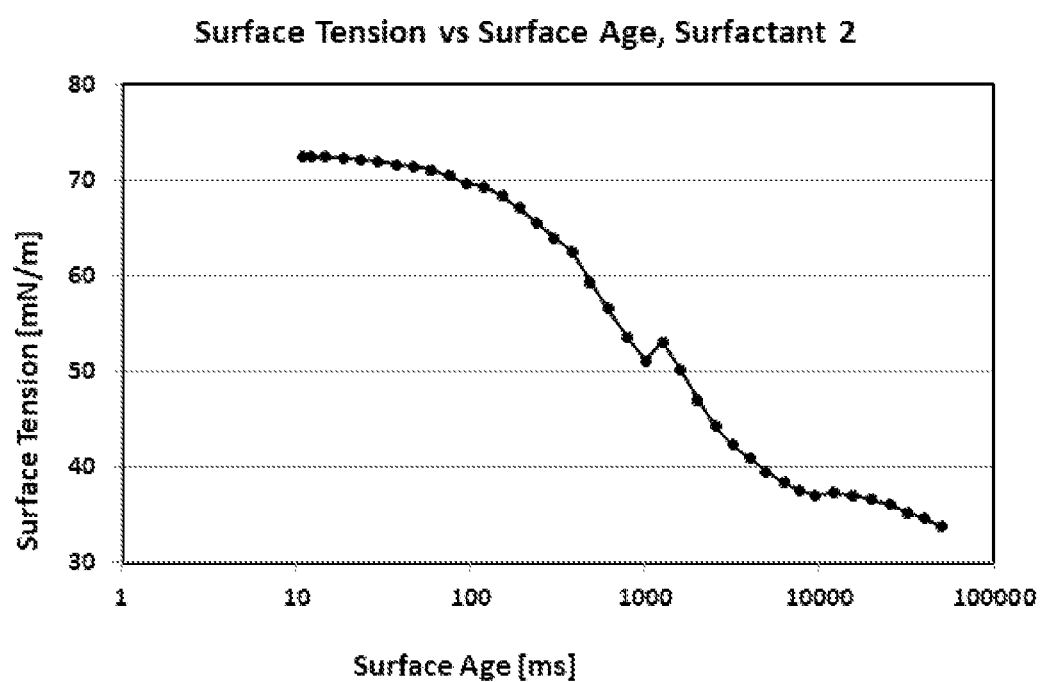
FIG. 4 shows a plot of dynamic surface tension as change in surface tension versus time for Surfactant 2 as described in Example 2c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 4 presents a plot of the surface tension versus time, showing that the compound fully saturated the surface in approximately 7.6 seconds. As can be seen in the plot, the dynamic surface tension is equal to or less than 40 mN/m at a surface age of 4900 ms or greater.

Example 2d

Determination of Wetting Properties of Surfactant 2

In addition to surface tension and surface dynamics, the wetting properties of the compound were tested on various surfaces. For example, hydrophobic substrates such as polyethylene-HD exhibit surface wetting with a contact angle of 39.3°, much lower than that of water. On oleophobic and hydrophobic substrates such as Teflon, the measured contact angle was much less than that of water, 57.4° (Table 3).

TABLE 3

| Substrate | CA of Surfactant (°) | Concentration | CA of water (°) |
|---|---|---|---|
| Teflon | 57.4 | 10× CMC | 119 |
| Polyethylene-HD | 39.3 | 10× CMC | 93.6 |
| Nylon | 21.7 | 10× CMC | 50 |
| Polyethylene terephthalate | 24.5 | 10× CMC | 65.3 |

Example 3a

Synthesis of 6-(dodecyloxy)-N,N-dimethyl-6-oxo-hexan-1-aminium chloride (Surfactant 3)

6-(Dimethylamino)hexanoic acid (11.99 g, 75.36 mmol) was dissolved in toluene (50 mL) in a round bottom flask equipped with a Dean-Stark trap. Dodecanol (12.68 g, 75.36 mmol) and p-toluene sulfonic acid monohydrate (PTSA) (14.33 g, 75.36 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-(dimethylamino)hexanoate in 51% yield. $^1$H NMR (DMSO) δ 4.00 (t, J=6.5 Hz, 2H), 2.27 (t, J=7.3 Hz, 2H), 2.13-2.16 (m, 2H), 2.01 (s, 6H), 1.54-1.53 (m, 6H), 1.27-1.18 (m, 20H), 0.86 (t, 3H).

Dodecyl 6-(dimethylamino)hexanoate (100 mg, 0.305 mmol) was dissolved in water (10 mL). Concentrated hydrochloric acid (11.14 mg, 0.305 mmol) was added.

Example 3b

Determination of Critical Micelle Concentration (CMC) of Surfactant 3

Figure 5:
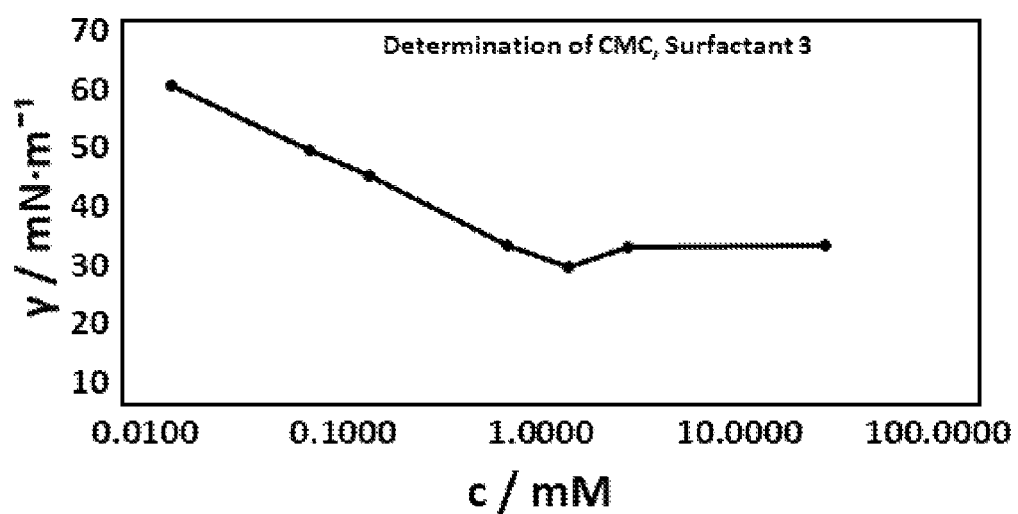
FIG. 5 shows a plot of surface tension versus concentration for Surfactant 3 measured at pH=7 as described in Example 3b, wherein the Y axis depicts the surface tension (γ) in millinewtons per meter (mN/m) and the X axis depicts the concentration (c) in millimoles (mM).

The critical micelle concentration (CMC) was tested. From the change in surface tension with concentration in water, the CMC was determined to be about 1.4 mmol. The plateau value of minimum surface tension that can be reached by this surfactant is about 30 mN/m, namely 30 mN/m±3 mN/m. FIG. 5 is a plot of these results, showing surface tension versus concentration. From the plot of the results, the surface tension at the CMC is equal to or less than about 30 mN/m. The plot further shows the surface tension to be equal to or less than 33 mN/m at a concentration of 2.7 mmol or greater.

Example 3c

Determination of Dynamic Surface Tension of Surfactant 3

Figure 6:
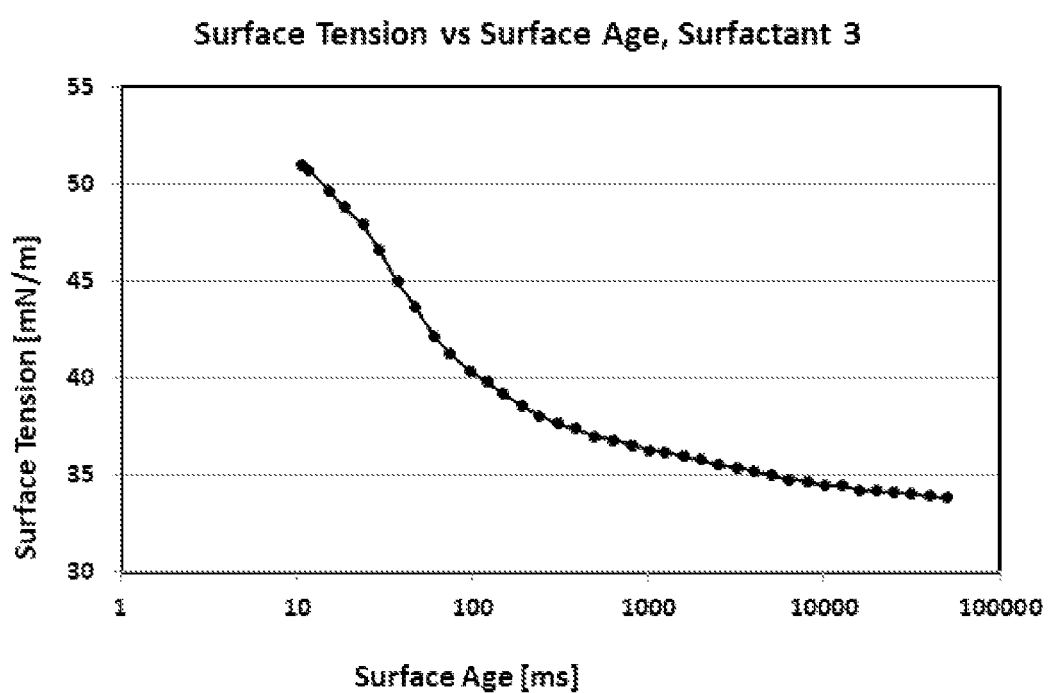
FIG. 6 shows a plot of dynamic surface tension as change in surface tension versus time for Surfactant 3 as described in Example 3c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 6 presents a plot of the surface tension versus time, showing that surface tension in the time interval between 1 and 100 ms drops rapidly from about 50 mN/m to about 40 mN/m. In the time interval from 100 to 50,000 ms, the surface tension drops slowly from 40 mN/m to about 34 mN/m, approaching asymptotically the saturation value of the surface tension at the CMC.

Example 3d

Determination of Wetting Properties of Surfactant 3

In addition to surface tension and surface dynamics, the wetting properties of the compound were tested on various surfaces. For example, hydrophobic substrates such as polyethylene-HD exhibit surface wetting with a contact angle of 42.5°. On oleophobic and hydrophobic substrates such as Teflon, the measured contact angle was much less than that of water, 66.6° (Table 4).

TABLE 4

| Substrate | CA of Surfactant (°) | Concentration | CA of water (°) |
|---|---|---|---|
| Teflon | 66.6 | 10× CMC | 119 |
| Polyethylene-HD | 42.5 | 10× CMC | 93.6 |
| Nylon | 15 | 10× CMC | 50 |
| Polyethylene terephthalate | 18.3 | 10× CMC | 65.3 |

Example 4a

Synthesis of 4-((6-(dodecyloxy)-6-oxohexyl)dimethylammonio)butane-1-sulfonate (Surfactant 4)

6-(Dimethylamino)hexanoic acid (11.99 g, 75.36 mmol) was dissolved in toluene (50 mL) in a round bottom flask equipped with a Dean-Stark trap. Dodecanol (12.68 g, 75.36 mmol) and p-toluene sulfonic acid monohydrate (PTSA) (14.33 g, 75.36 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-(dimethylamino)hexanoate in 51% yield. 1H NMR (DMSO) δ 4.00 (t, J=6.5 Hz, 2H), 2.27 (t, J=7.3 Hz, 2H), 2.13-2.16 (m, 2H), 2.01 (s, 6H), 1.54-1.53 (m, 6H), 1.27-1.18 (m, 20H), 0.86 (t, 3H).

Dodecyl 6-(dimethylamino)hexanoate (1.0 g, 3.05 mmol) was dissolved in ethyl acetate (30 mL). 1,4-Butanesultone (0.62 g, 4.57 mmol) was then added, and the mixture was heated to reflux for 12 hours. The reaction was cooled to room temperature, and the solvent was removed under vacuum. 1H NMR (DMSO) δ 4.00 (t, J=6.7 Hz, 2H), 3.29-3.15 (m, 4H), 2.97 (s, 6H), 2.47 (t, J=7.4 Hz, 2H), 2.33 (t, J=7.4 Hz, 2H), 1.81-1.70 (m, 2H), 1.66-1.55 (m, 6H), 1.32-1.23 (m, 20H), 0.86 (t, J=6.9 Hz, 3H).

Example 4b

Determination of Critical Micelle Concentration (CMC) of Surfactant 4

Figure 7:
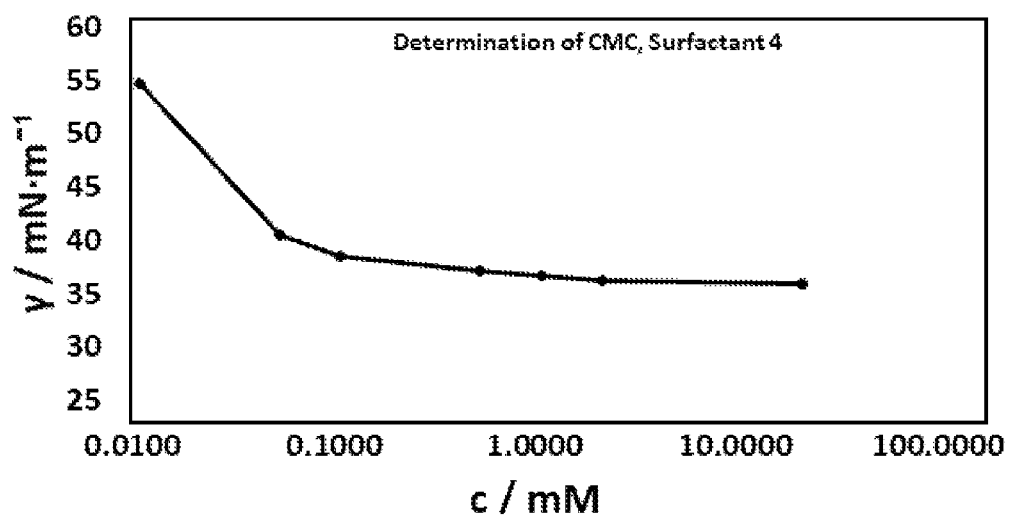
FIG. 7 shows a plot of surface tension versus concentration for Surfactant 4 measured at pH=7 as described in Example 4b, wherein the Y axis depicts the surface tension (γ) in millinewtons per meter (mN/m) and the X axis depicts the concentration (c) in millimoles (mM).

The critical micelle concentration (CMC) was tested. From the change in surface tension with concentration in water, the CMC was determined to be about 0.1 mmol. The plateau value of minimum surface tension that can be reached by this surfactant is about 38 mN/m, namely 38 mN/m±3.8 mN/m. FIG. 7 is a plot of these results, showing surface tension versus concentration. From the plot of the results, the surface tension at the CMC is about 38 mN/m, and the surface tension is equal to or less than 37 mN/m at a concentration of 1 mmol or greater.

Example 4c

Determination of Dynamic Surface Tension of Surfactant 4

Figure 8:
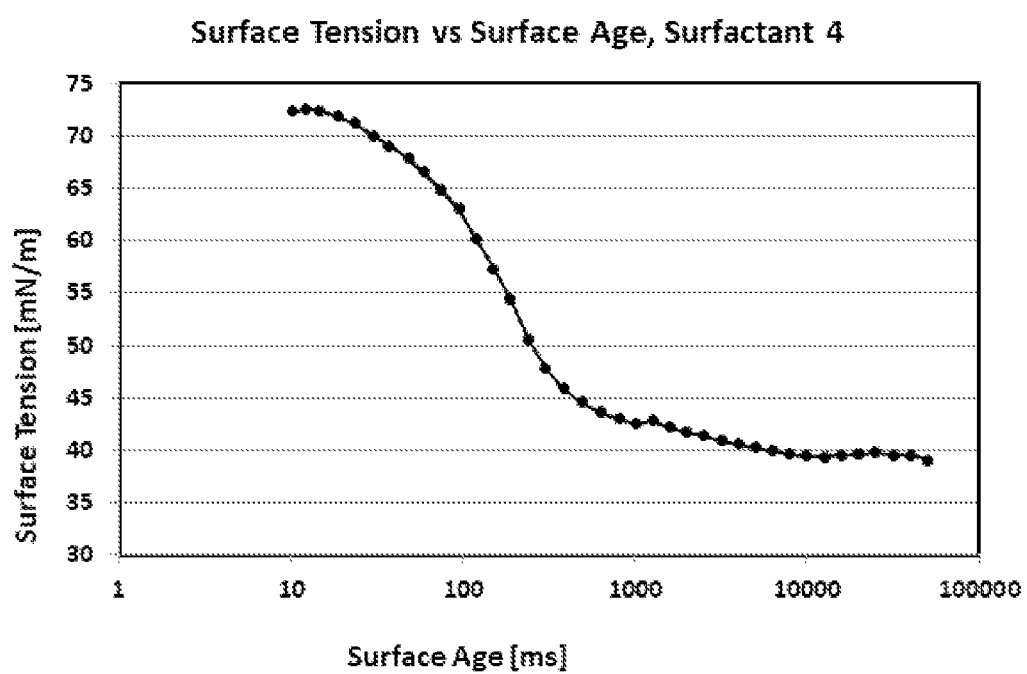
FIG. 8 shows a plot of dynamic surface tension as change in surface tension versus time for Surfactant 4 as described in Example 4c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 8 presents a plot of the surface tension versus time, showing that the compound fully saturated the surface in approximately 1 second. From the plot, the dynamic surface tension is equal to or less than 40.5 mN/m at a surface age of 4000 ms or greater.

Example 4d

Determination of Wetting Properties of Surfactant 4

In addition to surface tension and surface dynamics, the wetting properties of the compound were tested on various surfaces. For example, hydrophobic substrates such as polyethylene-HD exhibit surface wetting with a contact angle of 46.5°. On oleophobic and hydrophobic substrates such as Teflon, the measured contact angle was much less than that of water, 62.7° (Table 5).

TABLE 5

| Substrate | CA of Surfactant (°) | Concentration | CA of water (°) |
|---|---|---|---|
| Teflon | 62.7 | 10× CMC | 119 |
| Polyethylene-HD | 46.5 | 10× CMC | 93.6 |
| Nylon | 25.7 | 10× CMC | 50 |
| Polyethylene terephthalate | 35.6 | 10× CMC | 65.3 |

Example 5a

Synthesis of 6-(dodecyloxy)-6-oxohexan-1-aminium chloride (Surfactant 5)

6-Aminohexanoic acid (5.0 g, 38.11 mmol) was dissolved in toluene (50 mL) in a round bottom flask equipped with a Dean-Stark trap. Dodecanol (6.41g, 38.11 mmol) and p-toluene sulfonic acid monohydrate (PTSA) (7.24 g, 38.11 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-aminohexanoate in 40% yield.

Dodecyl 6-aminohexanoate (100 mg, 0.363 mmol) was dissolved in water (10 mL). Concentrated hydrochloric acid (13.23 mg, 0.363 mmol) was then added.

Example 5b

Determination of Critical Micelle Concentration (CMC) of Surfactant 5

Figure 9:
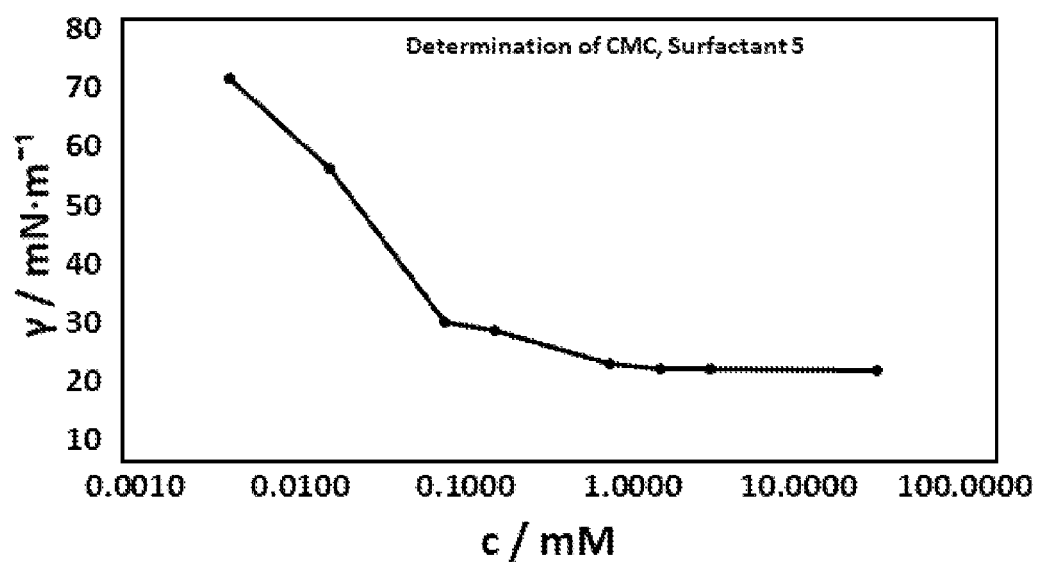
FIG. 9 shows a plot of surface tension versus concentration for Surfactant 5 measured at pH=7 as described in Example 5b, wherein the Y axis depicts the surface tension (γ) in millinewtons per meter (mN/m) and the X axis depicts the concentration (c) in millimoles (mM).

The critical micelle concentration (CMC) was tested. From the change in surface tension with concentration in water, the CMC was determined to be about 0.75 mmol. The plateau value of minimum surface tension that can be reached by this surfactant is about 23 mN/m, namely 23 mN/m±2.3 mN/m. FIG. 9 is a plot of these results, showing surface tension versus concentration. From the plot of the results, the surface tension at the CMC is about 23 mN/m, and surface tension is equal to or less than 23.2 mN/m at a concentration of 0.7 mmol or greater.

Example 5c

Determination of Dynamic Surface Tension of Surfactant 5

Figure 10:
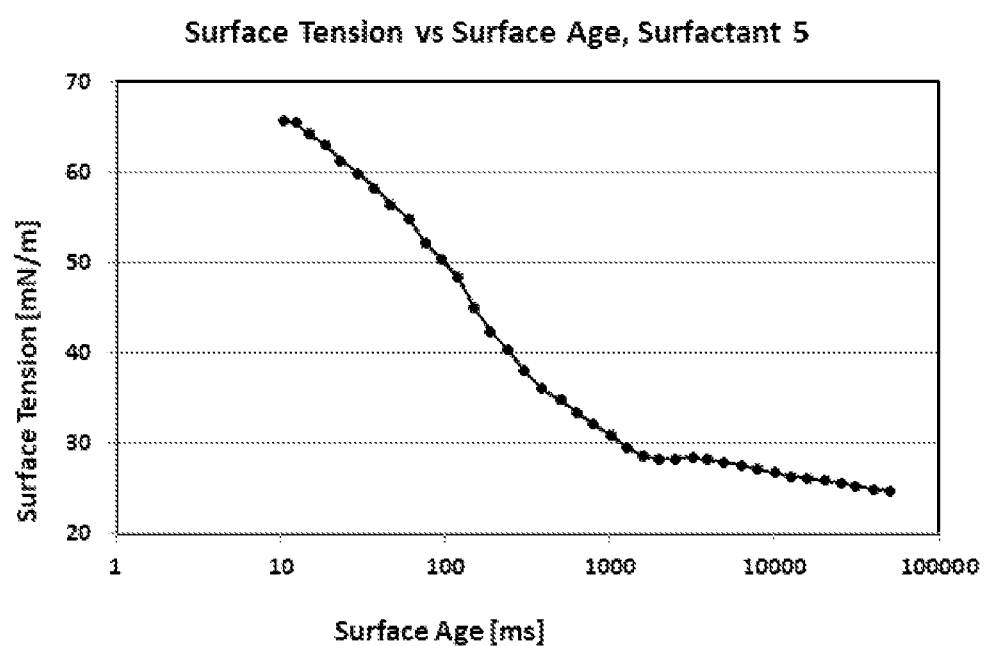
FIG. 10 shows a plot of dynamic surface tension as change in surface tension versus time for Surfactant 5 as described in Example 5c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 10 shows a plot of the results as surface tension versus time, showing that the compound fully saturated the surface in approximately 1.5 seconds. From the plot, the dynamic surface tension is equal to or less than 28.5 mN/m at a surface age of 3185 ms or greater.

Example 5d

Determination of Wetting Properties of Surfactant 5

In addition to surface tension and surface dynamics, the wetting properties of the compound were tested on various surfaces. For example, hydrophobic substrates such as polyethylene-HD exhibit surface wetting with a very low contact angle of 16.6°. On oleophobic and hydrophobic substrates such as Teflon, the measured contact angle was much less than that of water, 39.3° (Table 6).

TABLE 6

| Substrate | CA of Surfactant (°) | Concentration | CA of water (°) |
|---|---|---|---|
| Teflon | 39.3 | 10× CMC | 119 |
| Polyethylene-HD | 16.6 | 10× CMC | 93.6 |
| Nylon | 18.2 | 10× CMC | 50 |
| Polyethylene terephthalate | 15.3 | 10× CMC | 65.3 |

Example 6

Fracking Fluids

One of the compositions of the present invention comprises a mixture of water, a water soluble block co-polymer, and a non-ionic surfactant and inorganic salt containing mono- and/or di-valent and/or tri-valent ions. The preferred compositions of the present invention contain a mixture of water, a water soluble block co-polymer The relative amounts of the above-named components in the composition can be varied. Typically, the composition has 0.05 to 20 wt. % water soluble block copolymer, 0.01 to 10 wt. % nonionic surfactant, and 0.1 to 20 wt. % inorganic salt containing mono- and/or di-valent and/or tri-valent ions on a wet basis. The water-soluble mono- and/or di-valent electrolyte is typically used in amounts of from about 1 weight percent to about 15 weight percent, or about 1 to 10 weight percent, of the aqueous composition, based on weight of aqueous composition (a wet basis).

Some compositions of the present invention include a mixture of water, a water soluble block co-polymer The preferred compositions of the present invention include a mixture of water, a water soluble block co-polymer polymer, inorganic salt and nonionic surfactants and are essentially free of anionic surfactants.

The relative amounts of the above-named components in the composition can be varied. Typically, the composition has 0.05 to 20 wt % water soluble block copolymer, 0.01 to 10 wt % nonionic surfactant, and 0.1 to 20 wt % inorganic salt containing mono- and/or di-Valent and/or trivalent ions on a wet basis. The water-soluble mono- and/or di-valent electrolyte is typically used in amounts of from about 1 weight percent to about 15 weight percent, or about 1 to 10 weight percent, of the aqueous composition, based on weight of aqueous composition (a wet basis).

The relative amounts of the above-named components in the composition can be varied. However, typical ranges for water soluble block copolymer and nonionic surfactant of the overall compositions of some embodiments of the present invention on a wet basis are listed in Table 7.

TABLE 7

| | Water Soluble Block Polymer (wt. % wet basis) | Nonionic Surfactant (wt. % wet basis) | Inorganic Salt |
|---|---|---|---|
| Weight Percent (Broad) | 0.05-20 | 0.01-10 | 0.1 to 20 |
| Weight Percent (Preferred) | 0.1-10 | 0.08-3 | |

TABLE 7-continued

| | Water Soluble Block Polymer (wt. % wet basis) | Nonionic Surfactant (wt. % wet basis) | Inorganic Salt |
|---|---|---|---|
| Weight Percent (More Preferred) | 0.3-3 | 0.1-2 | |
| Polymer Weight Average Molecular Weight (Broad) | 5000 g/mol-1,000,000 g/mol | | |
| Polymer Weight Average Molecular Weight (Preferred) | 10000 g/mol-200,000 g/mol | | |
| HLB (Broad) | | 1-12 | |
| HLB (Preferred) | | 2-10 | |
| HLB (More Preferred) | | 6-10 | |

The water-soluble inorganic salt contains mono- and/or di-Valent and/or trivalentions. Inorganic salt concentration is typically used in amounts of from about 0.01 weight percent to about 20 weight percent or about 1 weight percent to about 15 weight percent, based on weight of aqueous medium, for example in amounts of from about 1 to 10 weight percent.

Example 7

Fracking Fluids

Nonlimiting examples of the inventive formulations include the compositions listed Table 8.

TABLE 8

| Ingredients | 1 | 2 | 3 | 4 | 5 |
|---|---|---|---|---|---|
| Hydrogen Chloride with Ammonium Bicarbonate | 5.0 2.0 | 7.5 2.0 | 10.0 | 12.25 | 15.0 |
| Sodium Alpha Olefin Sulfonate (surfactant) | | | 2.0 | 2.0 | 2.0 |
| PEG 6 | 2.0 | 2.0 | 2.0 | 2.0 | 2.0 |
| Guar gum | 0.0 | 0.0 | 0.0 | 0.0 | 1.0 |
| Carrier | balance | balance | balance | balance | balance |

Example 9

Corn Oil Demulsification

Nonlimiting examples of the inventive formulations for use in corn oil demulsification include the compositions listed in Table 9.

TABLE 9

| Component | Weight % |
|---|---|
| HCl with $NH_4HCO_3$ | 10-20 |
| Surfactant | 2-5 |
| Hexaethylene glycol | 1-4 |
| Guar gum | 1 |
| Carrier | 70-87 |

Example 10

Fluids for Improved Oil Recovery

An exemplary composition of an injection fluid suitable for improving the recovery of oil or gas from a well is as follows: 10 (a) 0.01 to 5 wt. % of one or more surfactants of the present invention, (b) an aqueous injection fluid, (c) 0-5 wt % of one or more alkali, 15 (d) 0-1% of one or more viscosifiers, (e) 0-50 wt. % of one or more co-solvents; (f) 0-50 wt. % of one or more co-surfactants, and; (g) 0-5 wt % of one or more co-surfactants. The aqueous carrier includes but is not restricted to water, produced brine, river water, synthetic brine, sea water.

Example 11

Formulations for Recovery Corn Oil From Stillage

Some exemplary corn oil extraction formulations are summarized in in Table 10. Each formulation may be used for corn oil demulsification.

The polyglycerol ester may be obtained from Lambent Technologies under the product designation Lumulse POE (26) Glyc. It includes polymerized glycerol and has an average of 26 moles of ethoxylation per mole of polymerized glycol. The Alkyl Polyglucoside used is BASF Glucopon® 225 DK, an alkylpolyglucoside including a C8-C10 alkyl group and an average of 1.7 glucose units per mole of alkylpoly-glucoside.

Peg 400 used is polyethylene glycol having an average molecular weight of 400 daltons. Peg 400 MO used is polyethylene glycol monooleate having an average molecular weight of 400 daltons. Peg 400 DO used is polyethylene glycol dioleate having an average molecular weight of 400 daltons.

PEG 400 Mono Soyate used is an ester of polyethylene glycol (having an average molecular weight of 400 daltons) and fatty acids derived from soybean oil. Soybean oil is a triglyceride typically including fatty acids as follows: myristic 0.1%; palmitic 11.0%; palmitoleic, 0.1%, stearic 4.0%, oleic 23.4%, linoleic 53.2%, linolenic 7.8%, arachidic 0.3%, and behenic 0.1%.

The hydrophobic silica is available as PP-35-FGK.
The hydrophilic silica is available as Sipernat 35.

TABLE 10

| Component | Weight % |
|---|---|
| White Mineral Oil | 0-60 |
| Surfactant | 10-100 |
| Hydrophobic Silica | 0-10 |
| PEG 400 | 0-30 |
| Polysorbate 80 | 0-90 |
| Hydrophilic Silica | 0-80 |
| Water | 0-90 |

ASPECTS

Aspect 1 is a formulation for the recovery of hydrocarbons, comprising: at least one surfactant of Formula I,

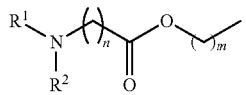

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; and an aqueous phase.

Aspect 2 is the formulation according to Aspect 1, further comprising at least one additional surfactant selected from the group consisting of: an anionic surfactant having a hydrophobic chain of 12 to 24 carbon atoms selected from the group consisting of sulfonate surfactants, sulfate surfactants, cationic surfactants, nonionic surfactants, and zwitterionic surfactants.

Aspect 3 is the formulation according either Aspect 1 or Aspect 2, wherein the aqueous phase comprises at least one inorganic salt, selected from the group consisting of: sodium chloride, sodium sulfate, potassium chloride, magnesium sulfate, and magnesium chloride.

Aspect 4 is the formulation according to any of Aspects 1-3, further comprising at least one polymer.

Aspect 5 is the formulation according to Aspect 4, wherein the at least one polymer is selected from the group consisting of: a quaternary ammonium compound, such as a cationic polymer comprising a quaternary diallyl dialkyl ammonium monomer, and/or an anionic surfactant, preferably an anionic polymer comprising an anionic monomer selected from the group consisting of acrylic acid, methacrylic acid, and combinations thereof, wherein the average molecular weight of said anionic polymer ranges from about 50,000 to about 10,000,000.

Aspect 6 is the formulation according to any of Aspects 1-3, further comprising lecithin or modified lecithin.

Aspect 7 is the formulation according to any of Aspects 1-6, further comprising at least one water immiscible solvent.

Aspect 8 is the formulation according to any of Aspects 1-7, further comprising at least one water miscible solvent.

Aspect 9 is the formulation according to Aspects 1-8, further comprising at least one gas selected from the group consisting of: air, nitrogen, carbon dioxide, and natural gas.

Aspect 10 is the formulation according to Aspects 1-9, further including at least one additive selected from the group consisting of: hydrogen chloride, an ammonium salt, ammonium bicarbonate, ammonium carbonate, or ammonium hydroxide, alcohol, crosslinking agent, breaker delay agents, particles, proppants, gas component, breaker aids, oxygen scavengers, alcohols, scale inhibitors, corrosion inhibitors, fluid-loss additives, biocides/bactericides, friction reducers, and latex.

Aspect 11 is the formulation of any of Aspects 1-10, wherein the surfactant is 6-(dodecyloxy)-N,N,N-trimethyl-6-oxohexan-1-aminium iodide, having the following formula:

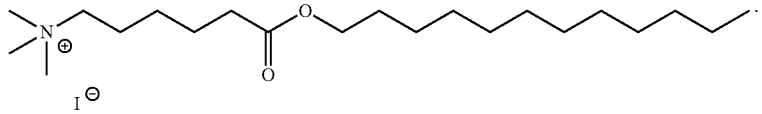 [SMILES: CCCCCCCCCCCCOC(=O)CCCCC[N+](C)(C)C ; [I-]]

Aspect 12 is the formulation of any of Aspects 1-10, wherein the surfactants is dodecyl 6-(dimethylamino) hexanoate N-oxide, having the following formula:

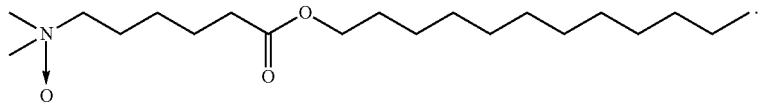

Aspect 13 is the formulation of any of Aspects 1-10, wherein the surfactant is 6-(dodecyloxy)-N,N-dimethyl-6-oxohexan-1-aminium chloride, having the following formula:

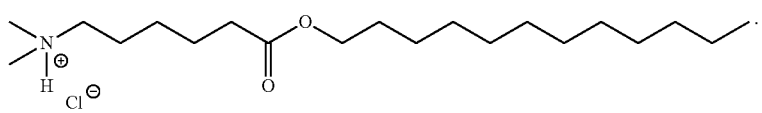 [SMILES: CCCCCCCCCCCCOC(=O)CCCCC[NH+](C)C ; [Cl-]]

Aspect 14 is the formulation of any of Aspects 1-10, wherein the surfactant is 4-((6-(dodecyloxy)-6-oxohexyl)dimethylammonio)butane-1-sulfonate, having the following formula:

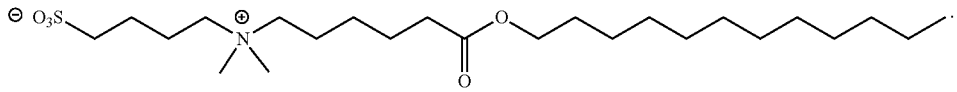

Aspect 15 is the formulation of any of Aspects 1-10, wherein the surfactant is 6-(dodecyloxy)-6-oxohexan-1-aminium chloride, having the following formula:

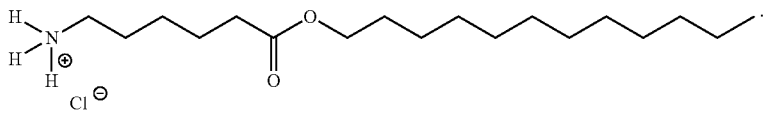

Aspect 16 is a method of recovering a hydrocarbon, comprising the steps of: providing at least one the formulations of any of Aspects 1-15; injecting the at least one formulation into a well; and recovering material from the well after the step of injecting the formulation into the well.

Aspect 17 is a method of recovering a hydrocarbon, comprising the steps of: providing at least one the formulations of any of Aspects 1-15; mixing the formulation with a material that includes a bio oil; and recovering the bio oil from the mixture.

Aspect 18 is the method according to Aspect 16, wherein the material that includes the bio oil is stillage.

Aspect 19 is a method of recovering a hydrocarbon comprising the steps of: introducing a foamed fluid composition within an oil or gas well and performing an operation with the foamed fluid composition wherein the foamed composition comprises: a base fluid comprises: an oil-based or a water-based fluid; a gas; and at least one surfactant of Formula I,

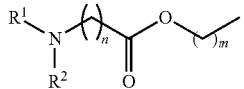

Formula I wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carboxyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

Aspect 20 is the method of Aspect 19, wherein the operation is selected from the group consisting of: a gas lift operation, a drilling operation, a completion operation, a stimulation operation, a fracturing operation, an injection operation, an enhanced oil recovery operation, and combinations thereof.

Aspect 21 is the formulation of either Aspect 19 or Aspect 20, wherein the surfactant is 6-(dodecyloxy)-N,N,N-trimethyl-6-oxohexan-1-aminium iodide, having the following formula:

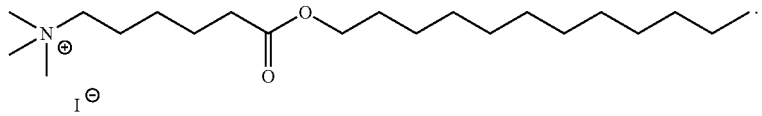 [SMILES: CCCCCCCCCCCCOC(=O)CCCCC[N+](C)(C)C ; [I-]]

Aspect 22 is the formulation of either Aspect 19 or Aspect 20, wherein the surfactants is dodecyl 6-(dimethylamino)hexanoate N-oxide, having the following formula:

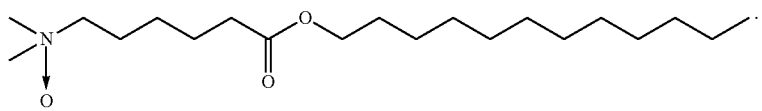

Aspect 23 is the formulation of either Aspect 19 or Aspect 20, wherein the surfactant is 6-(dodecyloxy)-N,N-dimethyl-6-oxohexan-1-aminium chloride, having the following formula:

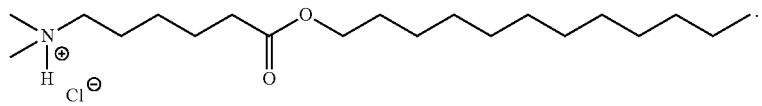 [SMILES: CCCCCCCCCCCCOC(=O)CCCCC[NH+](C)C ; [Cl-]]

Aspect 24 is the formulation of either Aspect 19 or Aspect 20, wherein the surfactant is 4-((6-(dodecyloxy)-6-oxohexyl)dimethylammonio)butane-1-sulfonate, having the following formula:

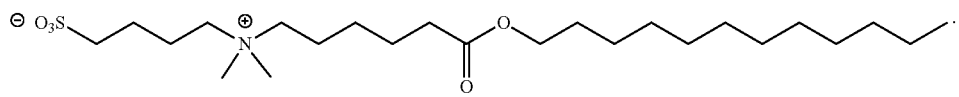

Aspect 25 is the formulation of either Aspect 19 or Aspect 20, wherein the surfactant is 6-(dodecyloxy)-6-oxohexan-1-aminium chloride, having the following formula:

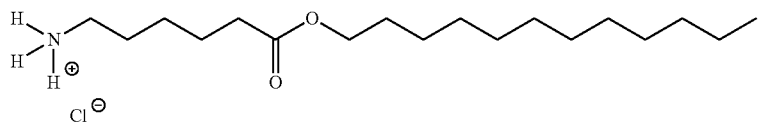

Aspect 26 is the formulation according to any of Aspects 1-10, wherein the surfactant comprises at least one of 6-(dodecyloxy)-N,N,N-trimethyl-6-oxohexan-1-aminium iodide, having the following formula:

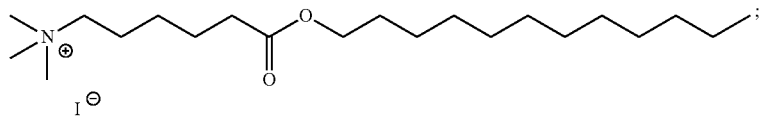 [SMILES: CCCCCCCCCCCCOC(=O)CCCCC[N+](C)(C)C ; [I-]]

dodecyl 6-(dimethylamino)hexanoate N-oxide, having the following formula:

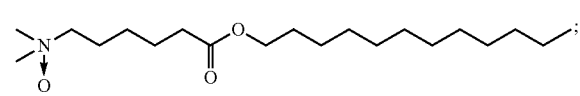

6-(dodecyloxy)-N,N-dimethyl-6-oxohexan-1-aminium chloride, having the following formula:

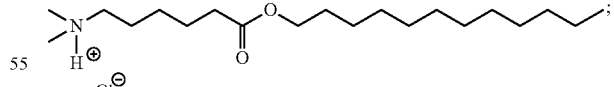

4-((6-(dodecyloxy)-6-oxohexyl)dimethylammonio)butane-1-sulfonate, having the following formula:

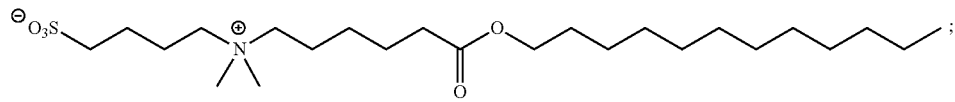

6-(dodecyloxy)-6-oxohexan-1-aminium chloride, having the following formula:

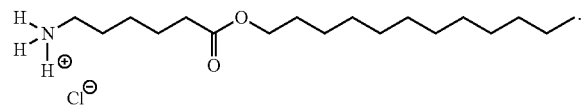

Aspect 27 is the formulation according to either Aspect 19 or Aspect 20, wherein the surfactant comprises at least one of 6-(dodecyloxy)-N,N,N-trimethyl-6-oxohexan-1-aminium iodide, having the following formula:

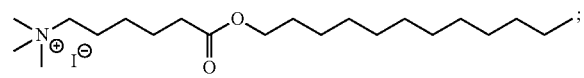 [SMILES: CCCCCCCCCCCCOC(=O)CCCCC[N+](C)(C)C ; [I-]]

dodecyl 6-(dimethylamino)hexanoate N-oxide, having the following formula:

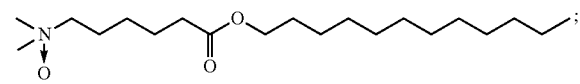

6-(dodecyloxy)-N,N-dimethyl-6-oxohexan-1-aminium chloride, having the following formula:

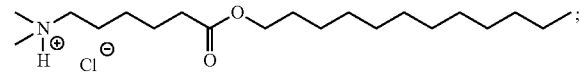 [SMILES: CCCCCCCCCCCCOC(=O)CCCCC[NH+](C)C ; [Cl-]]

4-((6-(dodecyloxy)-6-oxohexyl)dimethylammonio)butane-1-sulfonate, having the following formula:

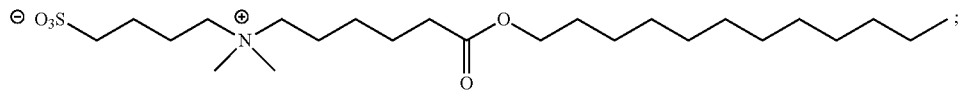

6-(dodecyloxy)-6-oxohexan-1-aminium chloride, having the following formula:

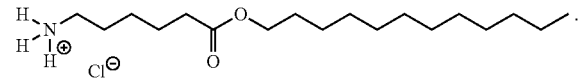

The invention claimed is:

1. A formulation for the recovery of hydrocarbons, comprising: at least one surfactant of Formula I,

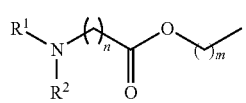

Formula I wherein $R^1$ and $R^2$ may be the same, and may be selected from the group consisting of hydrogen and $C_1$-$C_6$ alkyl, n is an integer from 2 to 5;

m is an integer from 9 to 20;

the terminal nitrogen is further substituted with $R^3$, wherein $R^3$ is selected from the group consisting of, oxygen, and an aqeous phase.

2. The formulation according to claim 1, further comprising at least one additional surfactant selected from the group consisting of: an anionic surfactant having a hydrophobic chain of 12 to 24 carbon atoms selected from the group consisting of sulfonate surfactants, sulfate surfactants, cationic surfactants, nonionic surfactants, and zwitterionic surfactants.

3. The formulation according to claim 1, wherein the aqueous phase comprises at least one inorganic salt, selected from the group consisting of: sodium chloride, sodium sulfate, potassium chloride, magnesium sulfate, and magnesium chloride.

4. The formulation according to claim 1, further comprising at least one polymer.

5. The formulation according to claim 4, wherein the at least one polymer is selected from the group consisting of: a quaternary ammonium compound, and an anionic surfactant.

6. The formulation according to claim 1, further including lecithin or modified lecithin.

7. The formulation according to claim 1, further comprising at least one water immiscible solvent.

8. The formulation according to claim 1, further comprising at least one water miscible solvent.

9. The formulation according to claim 1, further comprising at least one gas selected from the group consisting of: air, nitrogen, carbon dioxide, and natural gas.

10. The formulation according to claim 1, further including at least one additive selected from the group consisting of: hydrogen chloride, an ammonium salt, ammonium bicarbonate, ammonium carbonate, or ammonium hydroxide, alcohol, crosslinking agent, breaker delay agents, particles, proppants, gas component, breaker aids, oxygen scavengers, alcohols, scale inhibitors, corrosion inhibitors, fluid-loss additives, biocides/bactericides, friction reducers, and latex.

11. The formulation according to claim 1, wherein the surfactant comprises at least one of 6-(dodecyloxy)-N,N,N-trimethyl-6-oxohexan-1-aminium iodide, having the following formula:

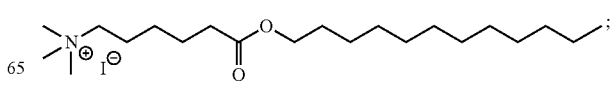

dodecyl 6-(dimethylamino)hexanoate N-oxide, having the following formula:

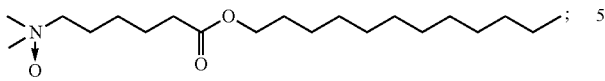

6-(dodecyloxy)-N,N-dimethyl-6-oxohexan-1-aminium chloride, having the following formula:

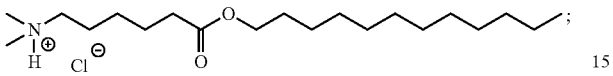

4-((6-(dodecyloxy)-6-oxohexyl)dimethylammonio)butane-1-sulfonate, having the following formula:

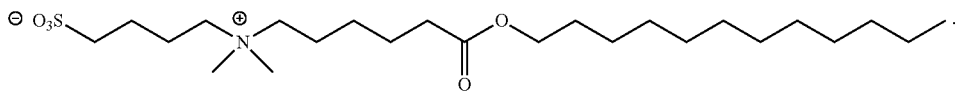

12. The formulation according to claim 1, wherein n is 5.

13. A method of recovering a hydrocarbon, comprising the steps of:
providing the formulation of claim 1;
injecting the at least one formulation into a well; and
recovering material from the well after the step of injecting the formulation into the well.

14. The method according to claim 13, wherein n is 5.

15. A method of recovering a hydrocarbon, comprising the steps of:
providing the formulation of claim 1;
mixing the formulation with a material that includes a bio oil; and
recovering the bio oil from the mixture.

16. The method according to claim 15, wherein the material that includes the bio oil is stillage.

17. The method according to claim 15, wherein n is 5.

18. A method of recovering a hydrocarbon comprising the steps of:
introducing a foamed fluid composition within an oil or gas well and performing an operation with the foamed fluid composition wherein the foamed composition comprises:
a base fluid comprises: an oil-based or a water-based fluid;
a gas,
at least one surfactant of Formula I,

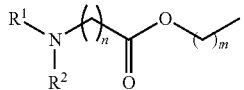

Formula I wherein $R^1$ and $R^2$ may be the same er different, and may be selected from the group consisting of hydrogen and C1-C6 alkyl, n is an integer from 2 to 5;
m is an integer from 9 to 20;
the terminal nitrogen is further substituted with $R^3$, wherein $R^3$ is selected from the group consisting of oxygen.

19. The method of claim 18, wherein the operation is selected from the group consisting of: a gas lift operation, a drilling operation, a completion operation, a stimulation operation, a fracturing operation, an injection operation, an enhanced oil recovery operation, and combinations thereof.

20. The method of claim 18, wherein the surfactant comprises at least one of 6-(dodecyloxy)-N,N,N-trimethyl-6-oxohexan-1-aminium iodide, having the following formula:

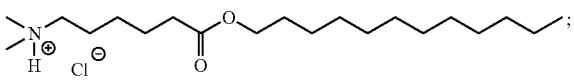 [SMILES: CCCCCCCCCCCCOC(=O)CCCCC[NH+](C)C ; [Cl-]]

dodecyl 6-(dimethylamino)hexanoate N-oxide, having the following formula:

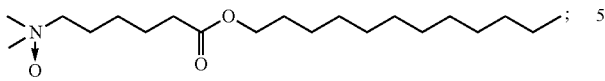

6-(dodecyloxy)-N,N-dimethyl-6-oxohexan-1-aminium chloride, having the following formula:

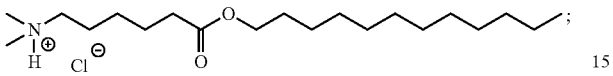

4-((6-(dodecyloxy)-6-oxohexyl)dimethylammonio)butane-1-sulfonate, having the following formula:
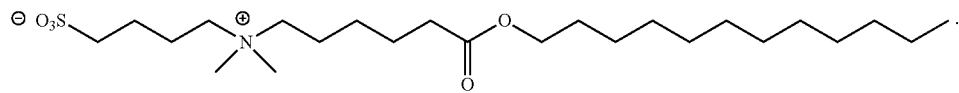
21. The method according to claim 18, wherein n is 5.
* * * * *